US011624005B2

(12) United States Patent
Mitchell et al.

(10) Patent No.: US 11,624,005 B2
(45) Date of Patent: Apr. 11, 2023

(54) LINERLESS LABEL AND METHOD FOR PREPARING A LABEL

(71) Applicant: UPM Raflatac Oy, Tampere (FI)

(72) Inventors: Noel Mitchell, Wuppertal (DE); Klaudia Korman, Bielany Wroclawskie (PL); Jan-Erik Forsstrom, Helsinki (FI); Tom Saxberg, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 350 days.

(21) Appl. No.: 15/115,402

(22) PCT Filed: Oct. 8, 2014

(86) PCT No.: PCT/FI2014/050765
§ 371 (c)(1),
(2) Date: Jul. 29, 2016

(87) PCT Pub. No.: WO2015/118215
PCT Pub. Date: Aug. 13, 2015

(65) Prior Publication Data

US 2017/0009108 A1 Jan. 12, 2017

(30) Foreign Application Priority Data

Feb. 10, 2014 (WO) .................. PCT/FI2014/050095
Feb. 10, 2014 (WO) .................. PCT/FI2014/050096
(Continued)

(51) Int. Cl.
*C09J 7/29* (2018.01)
*B32B 27/08* (2006.01)
(Continued)

(52) U.S. Cl.
CPC ................ *C09J 7/29* (2018.01); *B29B 17/02* (2013.01); *B32B 7/06* (2013.01); *B32B 7/12* (2013.01);
(Continued)

(58) Field of Classification Search
CPC .. B32B 7/12; B32B 7/06; B32B 27/08; B32B 27/10; B32B 27/302; B32B 27/304;
(Continued)

(56) References Cited

U.S. PATENT DOCUMENTS 3,892,901 A * 7/1975 Smith ...................... G09F 3/10 428/42.2
5,201,976 A 4/1993 Eastin
(Continued)

FOREIGN PATENT DOCUMENTS

BR PI0902205 A2 3/2011
CN 101711270 A 5/2010
(Continued)

OTHER PUBLICATIONS

International Search Report dated Nov. 6, 2014; International Application No. PCT/FI2014/050097 International Filing Date Feb. 10, 2014 (3 pages).
(Continued)

*Primary Examiner* — Scott R. Walshon
(74) *Attorney, Agent, or Firm* — Cantor Colburn LLP

(57) ABSTRACT

A printed linerless face laminate includes a release layer including a release agent, a second layer including a thermoplastic polymer, a second adhesive layer, a first layer including a thermoplastic polymer or fiber-based material, and a first adhesive layer including a pressure sensitive adhesive, wherein the print is on one or more printable
(Continued)

104 103 105 106 110 101 102 surface(s) between the first layer and the second layer. A method for producing the printed linerless face laminate is also described.

29 Claims, 8 Drawing Sheets

(30) Foreign Application Priority Data

Feb. 10, 2014 (WO) .................. PCT/FI2014/050097
Feb. 10, 2014 (WO) .................. PCT/FI2014/050098
Feb. 10, 2014 (WO) .................. PCT/FI2014/050099

(51) Int. Cl.

| | |
|---|---|
| ***B32B 37/12*** | (2006.01) |
| ***G09F 3/10*** | (2006.01) |
| ***B29B 17/02*** | (2006.01) |
| ***G09F 3/02*** | (2006.01) |
| ***B32B 7/12*** | (2006.01) |
| ***B32B 7/06*** | (2019.01) |
| ***B32B 27/10*** | (2006.01) |
| ***B32B 27/30*** | (2006.01) |
| ***B32B 27/32*** | (2006.01) |
| ***B32B 27/36*** | (2006.01) |
| ***B32B 38/00*** | (2006.01) |

(52) U.S. Cl.
CPC .............. *B32B 27/08* (2013.01); *B32B 27/10* (2013.01); *B32B 27/302* (2013.01); *B32B 27/304* (2013.01); *B32B 27/32* (2013.01); *B32B 27/325* (2013.01); *B32B 27/36* (2013.01); *B32B 37/12* (2013.01); *B32B 38/0004* (2013.01); *G09F 3/10* (2013.01); *B32B 2307/514* (2013.01); *B32B 2307/516* (2013.01); *B32B 2307/518* (2013.01); *B32B 2307/54* (2013.01); *B32B 2307/736* (2013.01); *B32B 2307/748* (2013.01); *B32B 2307/75* (2013.01); *B32B 2519/00* (2013.01); *C09J 2203/334* (2013.01); *C09J 2301/122* (2020.08); *C09J 2301/302* (2020.08); *C09J 2423/00* (2013.01); *C09J 2423/006* (2013.01); *C09J 2433/00* (2013.01); *C09J 2467/006* (2013.01); *G09F 2003/0222* (2013.01); *G09F 2003/0223* (2013.01); *G09F 2003/0229* (2013.01); *G09F 2003/0241* (2013.01); *G09F 2003/0258* (2013.01); *G09F 2003/0273* (2013.01)

(58) Field of Classification Search
CPC ....... B32B 27/32; B32B 27/325; B32B 27/36; B32B 37/12; B32B 38/0004; B32B 2307/514; B32B 2307/748; B32B 2307/75; B32B 2519/00; C09J 2201/606; C09J 2203/334; C09J 2423/00; C09J 2433/00; C09J 7/29; G09F 3/10; G09F 3/02; G09F 2003/023; G09F 2003/0241; G09F 2003/025; G09F 2003/0257
See application file for complete search history.

(56) References Cited

U.S. PATENT DOCUMENTS

| | | | | |
|---|---|---|---|---|
| 5,674,626 | A | 10/1997 | Khatib et al. | |
| 6,086,995 | A | 7/2000 | Smith | |
| 6,099,943 | A | 8/2000 | Moeller et al. | |
| 6,589,463 | B1 | 7/2003 | Vogt et al. | |
| 6,637,775 | B1 | 10/2003 | Bernier et al. | |
| 6,680,097 | B1 * | 1/2004 | Amberger | G09F 3/02 156/247 |
| 8,541,077 | B2 * | 9/2013 | Patel | B32B 27/08 428/34.9 |
| 8,573,276 | B2 | 11/2013 | Wade et al. | |
| 2002/0127361 | A1 * | 9/2002 | Sandt | B32B 7/12 428/40.1 |
| 2003/0031851 | A1 * | 2/2003 | Bourdelais | B65D 23/085 428/221 |
| 2009/0218307 | A1 * | 9/2009 | Davies | C09J 7/29 428/335 |
| 2009/0220757 | A1 * | 9/2009 | Patel | B32B 27/08 428/212 |
| 2009/0324883 | A1 | 12/2009 | Gray et al. | |
| 2010/0092703 | A1 * | 4/2010 | Fouquay | C09J 153/02 428/34.4 |
| 2010/0139707 | A1 | 6/2010 | Boonstra et al. | |
| 2011/0159218 | A1 | 6/2011 | Kimura et al. | |
| 2011/0215018 | A1 | 9/2011 | Schneider et al. | |
| 2012/0034402 | A1 | 2/2012 | Henderson | |

FOREIGN PATENT DOCUMENTS

| | | | | |
|---|---|---|---|---|
| EP | 1654162 | B1 | 5/2006 | |
| EP | 2418261 | A1 | 2/2012 | |
| GB | 1131523 | | 10/1968 | |
| JP | 2009199042 | | 9/2009 | |
| JP | 2011227215 | A | 11/2011 | |
| WO | 9833859 | A1 | 8/1998 | |
| WO | 0170484 | A1 | 9/2001 | |
| WO | 2008139028 | A1 | 11/2008 | |
| WO | WO-2012136895 | A1 * | 10/2012 | G09F 3/10 |
| WO | 2015118210 | A1 | 8/2015 | |
| WO | 2015118211 | A1 | 8/2015 | |
| WO | 2015118212 | A1 | 8/2015 | |
| WO | 2015118213 | A1 | 8/2015 | |
| WO | 2015118214 | A1 | 8/2015 | |
| WO | 2015118215 | A1 | 8/2015 | |

OTHER PUBLICATIONS

International Search Report dated Nov. 6, 2014; International Application No. PCT/FI2014/050098 International Filing Date Feb. 10, 2014 (3 pages).
International Search Report dated Nov. 6, 2014; International Application No. PCT/FI2014/050099 International Filing Date Feb. 10, 2014 (3 pages).
International Search Report dated Nov. 21, 2014; International Application No. PCT/FI2014/050095 ntnemational Filing Date Feb. 10, 2014 (5 pages).
International Search Report dated Nov. 21, 2014; International Application No. PCT/FI2014/050096 International Filing Date Feb. 10, 2014 (5 pages).
International Search Report dated Jan. 22, 2015; International Application No. PCT/FI2014/050765 International Filing Date Oct. 8, 2014 (6 pages).
Written Opinion dated Nov. 6, 2014; International Application No. PCT/FI2014/050097; International Filing Date Feb. 10, 2014 (5 pages).
Written Opinion dated Nov. 6, 2014; International Application No. PCT/FI2014/050098; International Filing Date Feb. 10, 2014 (3 pages).
Written Opinion dated Nov. 6, 2014; International Application No. PCT/FI2014/050099; International Filing Date Feb. 10, 2014 (5 pages).
Written Opinion dated Nov. 21, 2014; International Application No. PCT/FI2014/050095; International Filing Date Feb. 10, 2014 (11 pages).
Written Opinion dated Nov. 21, 2014; International Application No. PCT/FI2014/050096; International Filing Date Feb. 10, 2014 (9 pages).
Written Opinion dated Jan. 22, 2015; International Application No. PCT/FI2014/050765; International Filing Date Oct. 8, 2014 (11 pages).

(56) References Cited

OTHER PUBLICATIONS

Demeuse, “Biaxial stretching of film”, Chapter 1. (2011).
Demeuse,“Biaxial Stretching of film”, Chapter 14, (2011).

* cited by examiner

LINERLESS LABEL AND METHOD FOR PREPARING A LABEL

CROSS-REFERENCE TO RELATED APPLICATIONS

This application is a National Stage application of PCT/FI2014/050765, filed Oct. 8, 2014, which claims priority to International Application Nos. PCT/FI2014/050095, filed Feb. 10, 2014, PCT/FI2014/050096, filed Feb. 10, 2014, PCT/FI2014/050097, filed Feb. 10, 2014, PCT/FI2014/050098, filed Feb. 10, 2014, and PCT/FI2014/050099, filed Feb. 10, 2014, all of which are incorporated by reference herein in their entirety.

FIELD OF THE APPLICATION

The present application relates to linerless self-adhesive label for container, a method and an apparatus for preparing said label, and labelled items.

BACKGROUND OF THE APPLICATION

It is general practice to apply labels to the surface of containers, such as bottles made of polymer or glass, to provide decoration, identification, and/or information for example on the contents of the container. Plastic labels, in contrast to paper labels, are increasingly preferred, for example due to their more appealing appearance (for example transparency) and better mechanical properties. The containers, such as bottles in the beverage industry, are generally reused many times and thus there is a need for plastic labels which are easily and completely removed from the surface of the container during conventional washing processes such as hot dilute caustic soda. Thus, removable labels are an important topic, for example, in beverage industry.

Wash-off labels, known from prior art, have been based on paper materials, which may become easily disintegrated into the washing liquid. Another known approach, which is typically used in combination with paper labels, has been to select adhesives which are soluble into water-based washing liquid and thus lead to the removal of the labels. The use of such adhesives requires that the label material allows the washing liquid to penetrate into the adhesive layer so that rapid loosening of the label is possible. Even if these approaches may facilitate quick and effective removal of the labels in the washing process without leaving markings or residues on the container, they may suffer from the major drawback that the washing liquid quickly becomes contaminated by the label material and/or the dissolved adhesive components.

Yet another approach is that the label structure comprises a heat-shrinkable plastic film layer causing the label to curl and detach the label from the surface of an item under typical washing conditions at 80-85° C. in an alkaline solution. Typically these labels comprise a release liner, for example a polyester film, coated with silicone which is then further coated with a pressure-sensitive adhesive and dried under heat in an oven. The major deficiencies of these types of constructions are that they are rather costly and in addition, in some cases they are using environmentally questionable PVC solutions.

It would be desirable to produce wash-off labels which are economical but also environmentally friendly, totally removable from a surface of an item without leaving deposits or remnants of adhesive on the surface of the item. It would be desirable if the materials could be separated and easily recycled.

SUMMARY

It is an object of the invention to provide a linerless label. It is another object of the invention to provide labelled items. It is another object of the invention to provide a method for producing a said label. It is another object of the invention to provide an apparatus for preparing said label.

One embodiment provides a printed linerless face laminate comprising the following layers in the following order:
- a release layer comprising a release agent,
- a second layer comprising a thermoplastic polymer,
- a second adhesive layer,
- a first layer comprising a thermoplastic polymer or fiber-based material, and
- a first adhesive layer comprising a pressure sensitive adhesive, wherein the print is on one or more printable surface(s) between the first layer and the second layer.

In one embodiment at least one of the first layer and the second layer comprises a non-annealed monoaxially oriented film.

One embodiment provides a printed linerless face laminate comprising the following layers in the following order:
- a second layer comprising second shrinkable uniaxially oriented film,
- a second adhesive layer,
- a first layer comprising first shrinkable uniaxially oriented film, which is oriented in different direction to the second shrinkable uniaxially oriented film, and
- a first adhesive layer comprising pressure sensitive adhesive.

One embodiment provides said printed linerless face laminate wound into a roll.

One embodiment provides a labelled item having said face laminate attached to a surface of said item.

One embodiment provides a method for producing a printed linerless face laminate, the method comprising providing a printable laminate having one or more printable surface(s) and multiple layers in the following order:
- a first layer comprising a thermoplastic polymer or fiber-based material,
- a first adhesive layer comprising a pressure sensitive adhesive,
- a release layer comprising a release agent, and
- a second layer comprising a thermoplastic polymer;

printing on the one or more printable surface(s);
separating
the first layer and the first adhesive layer, from
the release layer and the second layer;
rearranging
the release layer and the second layer
on top of
the first layer and the first adhesive layer, with the release layer on top of the construction; and
laminating the first layer and the second layer together with a second adhesive layer, to form the printed linerless face laminate.

One embodiment provides a printed face laminate web obtained with said method.

One embodiment provides a method for preparing a laminate or a face laminate web, the method comprising die-cutting the printed face laminate through all the layers to form a plurality of predefined shapes for the printed face laminate, and defining a bridge between individual shapes to form a laminate web having plurality of individual shapes attached to each other.

One embodiment provides a printed face laminate web having plurality of individual shapes attached to each other obtained with said method.

One embodiment provides an apparatus for manufacturing a linerless face laminate comprising means arranged to receive a laminate web comprising a printable laminate having one or more printable surface (s) and comprising multiple layers in the following order:

a first layer comprising a thermoplastic polymer or fiber-based material, a first adhesive layer comprising a pressure sensitive adhesive, a release layer comprising a release agent, and a second layer comprising a thermoplastic polymer;

delaminating means arranged to delaminate the first layer and the first adhesive layer, from the release layer and the second layer;

laminating means comprising means for laminating the second layer and the first layer together and means for rearranging the release layer and the second layer on top of the first layer and the first adhesive layer, with the release layer on top of the construction, to form a linerless face laminate.

The main embodiments are characterized in the independent claims. Various embodiments are disclosed in the dependent claims. The features recited in dependent claims are mutually freely combinable unless otherwise explicitly stated.

The preparation process of the linerless face laminate produces an end product having a release agent layer on top of the face laminate, and a pressure sensitive adhesive on the other side of the face laminate. The construction of the face laminate or the label enables winding of the self-adhesive, linerless label web onto itself. The label roll is unwound in order to cut separate labels from the label web and/or to provide self-adhesive labels to an article. According to embodiments, the layer next to the adhesive layer, when the label web is wound to a roll, is a release layer. The release layer wound next to the adhesive layer enables the label web to be releasably wound on itself. The release layer on one side of the face stock is arranged to form a release layer for the self-wound linerless label according to embodiments. The release layer also facilitates the handling of the face laminate web in the process as the reduced coefficient of friction provides smoother running.

One effect of the label according to embodiments is providing a linerless label. No disposable release liner is needed for the printed label (stock) according to embodiments. This decreases the amount of waste. An effect of embodiments is providing a linerless, self-adhesive label web, which is woundable onto itself. Further effect of the label according to embodiments is enabling fast adhering of labels to the consumer products.

The label web and the methods according to embodiments enable two-step cutting, for example using contactless and/or die-cutting, of the labels. Most of the cutting in the first cutting phase may be done using die-cutting methods, which are straightforward. Substantial shapes can be formed to the web at this phase. After the first cutting the waste matrix and the label web can be separated as continuous webs. For one label web two waste matrix webs are formed at the both sides of the label web. This cutting phase may be carried out at the same facilities wherein the face laminate is printed and/or prepared. The pre-cut face laminate may be wound onto itself for storage and/or transportation. Such a continuous label roll containing the pre-cut labels may be provided to a separate site of use, such as to the labelling and/or dispensing machine for feeding the labels onto the surface of the items to be labelled. Separate labels may be cut from the label web in the second cutting phase using for example contactless cutting, such as a laser, which is handy, fast, accurate and does not apply pressure to the pressure sensitive adhesive of the label. Also a contacting cutting method may be applied in the second cutting phase. As the waste matrix is cut and removed already during the first cutting phase, this has an effect that no waste material will be created at the labelling phase itself. Generally a major cutting is carried out in the first phase and the separation of the labels in the second phase may be considered more as a minor cutting.

Another effect of the embodiments is avoiding a separate coating phase. No additional coating needs to be provided. The printed surface does not need any separate layer, but an existing laminate layer is used to form an overlying layer to the printed surface. This has effect of enabling printing and coating the printed surface at the same process phase.

According to embodiments no separate transferring of the printed label, nor separate coating units/stations are required. It is possible to transfer the existing adhesive layer with the existing equipment and/or at the same process phase. Conventionally printed label web may be transferred to a different site in order to provide a layer on top of the print layer. According to embodiments it is not necessary to wound and/or transfer the printed face stock for any further process. An embodiment has an effect of enabling printing and over coating the print with the adhesive layer at the printing press.

At least some/all embodiments have effect of saving time and money. This may be due to lacking an extra layer and/or lacking extra process step, and/or lacking need to transfer the printed label web to any further premises. An effect of the embodiments is to finalize the printed surface and/or to provide a pre-cut label web ready for labelling process at one site.

An effect of the oriented films is that the stiffness of the film is high. Further, if one of the layers is machine direction oriented, the stiffness will further increase. During the preparation process the linerless laminate is printed, opened, rearranged and relaminated, and the stiffness of one or more of the films will facilitate the processability and handling of the films in the process.

Also the increased stiffness will help the processability of the linerless end product for example in the dispensing machine when the labels are separated and/or fed to the items to be labelled. Also in the washing phase the increased stiffness will facilitate the washability of the labels. However the increased stiffness will cause problems if the labels will stick together.

As the print is on a printable surface between the first layer and the second layer, it provides an effect of being protected against any wearing or contamination during the production, storage, transportation and use. Further, during the washing of the labels the print ink will not be washed off to contaminate the washing solution and/or the recyclable materials of the containers.

DETAILED DESCRIPTION OF THE EMBODIMENTS

Figure 1:
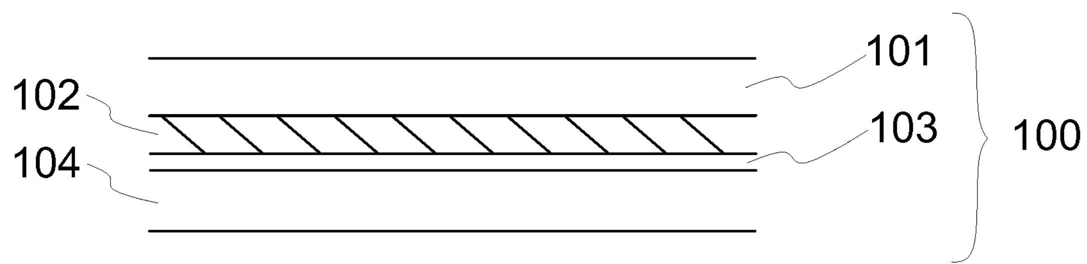
FIG. 1 illustrates a cross-sectional view of the structure of a laminate

Generally label is a piece of material carrying information and to be applied (affixed) onto articles of different shapes and materials. It is general practice to apply a label to a surface of an article to provide decoration and/or to display information about the product being sold, such as content of the article, a trade name or a logo. In a labelling process individual pressure sensitive adhesive labels may be separated from a liner and transferred to the article. Alternatively, inmould labelling, hangtag or linerless labels may be used.

Label webs or labels which are provided to users without release liners over an adhesive layer are referred to as linerless label webs or linerless labels. Elimination of release liners reduces the material costs of the labels but also avoids the disposal of the release liner after the application of the labels. Moreover, the exclusion of the liner decreases the thickness in a roll of labels and more labels can be provided per roll.

Labels may be used in wide variety of labelling applications and end-use areas, such as beverage labelling, food labelling, home and personal care product labelling, and labelling of industrial products. The surface of the labelled article may be for example plastic, glass, metal, or paper based. The labelled article may be for example a container, such as a bottle, jar, canister, can, tin or the like. The label may also be applied to semi-rigid or flexible packages used for e.g. sandwich packs, meat trays, salads, fish trays and the like. Examples of such articles include glass bottles, metal bottles, polyethyleneterphtalate (PET) bottles, and bottles made of polyolefin, such as high density polyethylene (HDPE) and polypropylene (PP). The label may surround the labelled item, such as a bottle, completely or partially.

Conventionally a self-adhesive laminate comprises a facestock, such as paper based face material or filmic face material, an adhesive which is coated on the reverse side of the face material, a release coating, and a backing. The release coating, such as a silicone layer, is added to the upper side of the backing. The chemistry of the release coating defines the force required to release the adhesive (and therefore the label face) from the backing. Printable facestock is suitable for printing by any of the known printing methods, such as with gravure, flexographic process, offset, screen or letterpress. Also digital printing methods may be used, for example by liquid toner, dry toner or ink-jet process.

Lamination means placing together material layers, such as separate plastic film layers, by means of a suitable surface treatment of the films, primer or lamination adhesive between the layers, to form a laminate. The laminates and the layers therein described herein may be manufactured using any suitable method for preparing laminates and/or layers for the laminates. Examples of such methods for preparing the layers include extrusion, coextrusion and coating methods. The film layers are generally plastic film layers, preferably thermoplastic film layers.

A face laminate as used herein refers to a multi-layered laminate having a printable surface being able to carry information, said laminate being attachable to a surface of an item to be labelled. The face laminate may also be called a label. The face laminate may be printed or non-printed. A printed face laminate or label carries information on said printable surface, such as text and/or graphical information. A face laminate contains at least a face stock and an adhesive for attaching the face laminate onto a surface of the item to be labelled. Generally a multi-layered laminate contains at least two layers attached (laminated) to each other with an adhesive, such as a laminating adhesive. A coextruded structure is not a multi-layered laminate, but a multi-layered laminate may contain a coextruded structure as one layer.

An adhesive layer may be applied onto the laminate. An emulsion adhesive layer may be applied e.g. by using a curtain coating, reverse gravure, slot-die or roller-coating methods. A hot-melt adhesive may be applied e.g. by using slot-die or roller coaters. If emulsion adhesive is used the water may be evaporated from the adhesive dispersion by using e.g. hot air jets or infra-red heaters.

A pressure sensitive adhesive layer may be a continuous coating covering 100% of the face laminate. Alternatively, it may be applied discontinuously as spots or strips covering less than 100% of the face laminate. For example, the adhesive may cover between 10 to 90% of the total area of the face laminate.

A continuous label web may be cut during labelling in order to provide individual labels having a desired shape and size. Said label may be prepared from a printable laminate having a printable surface, which laminate may be provided as a self-wound roll.

One example, as illustrated in FIG. 1, provides a printable laminate 100 comprising multiple layers in the following order: a first layer 101 comprising a thermoplastic polymer or fiber-based material, a first adhesive layer 102 comprising a pressure sensitive adhesive, a release layer 103 comprising a release agent, and a second layer 104 comprising a thermoplastic polymer. In one embodiment the laminate consists of said layers. In one embodiment at least one of the first layer and the second layer comprises a non-annealed monoaxially oriented film. In one embodiment both the first layer and the second layer comprise an oriented film. In one embodiment the non-annealed monoaxially oriented film is a shrinkable monoaxially oriented film. In one embodiment the first layer 101 has a printable surface.

In one embodiment the second 104 layer has a printable surface. In one embodiment both the first layer 101 and the second layer 104 have a printable surface. In one embodiment the first layer comprises a non-annealed film and the second layer comprises a non-annealed film. In one embodiment both the first layer and the second layer comprise a shrinkable monoaxially oriented non-annealed film.

Said printable surface is a surface which can be printed when preparing the printed label. A printable surface refers to any suitable ink receiving surface which may be printed and wherein the print will remain. Excluded are surfaces wherein the printing ink will not be attached properly, for examples surfaces treated with release agents, adhesives or any other slippery or tacky surfaces which do not allow permanent or quality printing. "A printable surface" as used herein does not exclude the presence of more than one printable surfaces, for example two printable surfaces.

In one embodiment the first layer 101 comprises at least one thermoplastic polymer, such as a polymer selected from polyolefins, polyesters, cyclic olefin polymers or copolymers or the like. The first layer 101 may also comprise or further comprise at least one polymer based on or derived from a thermoplastic polymer. The content of said thermoplastic polymer or the polymer derived from said thermoplastic polymer in the layer may be for example in the range of about 10-100% (w/w). If the first layer consists of said polymer or substantially consists of said polymer, the content of the polymer in the layer may be in the range of about 95-100% (w/w), more particularly about 98-100% (w/w), or even about 99-100% (w/w). If the first layer contains several polymers, the content of a single type of polymer in the layer may be in the range of about 20-80% (w/w), or about 30-70% (w/w), or about 40-60% (w/w) or about 50% (w/w). In one example the first layer does not contain fiber-based material.

In one embodiment the first layer comprises polyester, for example at least 80% polyester, or at least 90% polyester. In many cases the PET films contain 100% of PET. In one embodiment the second layer comprises polyolefin, for example at least 70% polyolefin, or at least 80% polyolefin. In a case of polyolefin/polystyrene coextrusion the content of polyolefin may be in the range of 40-70%.

The first layer may comprise a polymer selected from for example polyethylene, polypropylene, polyethylene terephthalate, polylactic acid, polystyrene, polyvinyl chloride, cyclic olefin (co)polymer, copolymers, derivatives and coextrusion blends thereof.

The first layer 101 may comprise a monolayer film or a multilayer film having two or more layers and it has a first side and a second side. In one embodiment the first side has a printable surface which enables printing on the layer. The first layer 101 may also be called as a first film layer and it may act as the facestock of the final label. The first layer 101 may have a thickness in the range of about 10-50 μm, for example in the range of about 10-40 μm, or 10-30 μm. In one embodiment the first layer 101 is a monolayer film. In one embodiment the first layer 101 is oriented. In one embodiment the first layer 101 is non-oriented. In one embodiment the first layer is annealed and therefore non-shrinkable. In one embodiment the areal shrinkage of such non-shrinkable layer or film is less than 5%, for example less than 2%, at 80° C., for example in the range of 0.5-2.0%.

In one embodiment the first layer is non-annealed and therefore shrinkable. The first layer may be mono-axially oriented or biaxially oriented. In one embodiment the first layer comprises a shrinkable monoaxially oriented film having an areal shrinkage in the direction of the orientation of at least 5% at 80° C., for example at least 10%. In one embodiment the first layer comprises a shrinkable monoaxially oriented film having an areal shrinkage in the direction of the orientation in the range of 5-60% at 80° C. or in the range of 10-60% or 20-60%.

The areal shrinkage may be defined for example by using standards ASTM D1204 or ASTM D2732, for example using air as the heating medium at 80° C. for at least 3 minutes, or using liquid, such as water, as the heating medium at 80° C. for at least 3 minutes. In one embodiment the tensile modulus (ASTM D882) of an oriented first layer in the machine direction is 0.8-3.0 GPa after immersion in water at 80° C. for at least 3 minutes.

In one embodiment the first layer comprises a non-annealed biaxially oriented film. In one embodiment the first layer comprises an annealed biaxially oriented film. The film may comprise for example polypropylene, PET, polystyrene, polylactic acid or COC.

The film of the first layer 101 may be transparent or clear. From the optical point of view, high transparency of the labels may be preferred. Transparent (clear) labels are substantially transparent to visible light. Transparent no-label look appearance of the label is advantageous, for example, in applications where the objects beneath the label, i.e. the surface of a bottle, should be visible through the label. The haze level of a layer according to embodiments should be lower than 35%, preferably equal to or lower than 25% or lower than 10%, when tested according to the standard ASTM D1003. According to embodiments the haze of a clear upper film of a label is between 20 and 35% prior to possible printing and over-varnishing. During possible printing and/or over coating, like varnishing, the haze of the film is reduced. The haze of an over-vanished film may be lower than 10%, or lower than 8%, for example 2-6%, or 4-5%. Haze is tested according to standard ASTM D1003. Higher haze values may have positive effect on handling the film before and during printing and subsequent over-vanishing steps. In one embodiment the haze of the first layer is less than 10%, preferably less than 5%. When the haze is low also the adhesives used should be clear or transparent. If a polyethylene film is used, the haze may be higher, even 25% or less.

The haze of the silicone layer should also be low as the silicone is the topmost layer of the label. The haze affects to the appearance of the printed label, for example how sharp the print looks. If the label has been printed with an opaque ink, the haze is originated substantially only from the silicone layer. In one embodiment the haze of the silicone layer is less than 25%, or less than 10%, preferably less than 5%, or less than 3%.

Alternatively, opaque and/or white films may be provided. In an embodiment of an opaque film, the film comprises additive to provide a desired colour. An additive may comprise one or more pigments or inorganic fillers, for example titanium dioxide, calcium carbonate and/or combination of those. As an example, a black film is provided with additive carbon black. An opaque film may have an opacity of at least 70%, or at least 75%, or at least 80%. Opacity may be 70-95%, or preferably 70-80%. Alternatively, opacity may be less than 12%. In a multilayer film structure the pigment may be included in one or more of the layers.

In one embodiment the first layer 101 comprises fiber-based material. Said fiber-based material may be paper, such as printable paper, for example thermally printable paper. In one example the first layer does not contain thermoplastic polymer.

The first adhesive layer 102 has a first side and a second side. The first side of the first adhesive layer 102 is attached to the second side of the first layer 101. The first adhesive layer 102 comprises a pressure sensitive adhesive (PSA), such as acrylic based adhesives or natural or synthetic rubber containing elastomers, tackifiers and/or silicone based pressure sensitive adhesives. Pressure sensitive adhesive, also known as self-stick adhesive, forms a bond when pressure is applied at room temperature. PSA labels can be adhered to most surfaces through an adhesive layer without the use of a secondary agent such as solvents or heat to strengthen the bond. Examples of pressure sensitive adhesives, such as pressure sensitive adhesive sensitive to the washing conditions, include emulsion and water based PSAs, solvent based PSAs and solid PSAs. In one embodiment the pressure sensitive adhesive comprises UV hot melt adhesive. In one example the first adhesive layer 102 consists of the pressure sensitive adhesive. In one embodiment the pressure sensitive adhesive sensitive to the washing conditions comprises UV curable adhesive, such as UV hot melt adhesive. This may be UV acrylic adhesive. The pressure sensitive adhesive may be a dispersion of acrylates In one example the first adhesive layer 102 consists of the pressure sensitive adhesive sensitive to the washing conditions. The first adhesive layer 102 may have a thickness in the range of about 5-40 μm, for example in the range of about 8-20 μm. The amount of the adhesive layer may be 10-20 g/m$^2$, or preferably less than 15 g/m$^2$; or more preferably less than 10 g/m$^2$. The second side of the first adhesive layer 102 faces the release layer 103.

The pressure sensitive adhesive may be deactivatable, which means that the adhesion of the pressure sensitive adhesive decreases at washing conditions, which generally comprise increased temperature and alkaline conditions. Preferably the adhesion of the pressure sensitive adhesive to the labelled item decreases more than the adhesion to the face laminate so that the deactivatable PSA remains attached to the face laminate. The increased temperature may be at least 50° C., for example 65° C., 75° C. or 80° C. The alkaline conditions refer to an aqueous solution containing alkaline agent, such as NaOH, KOH, LiOH, MgOH, CaOH, or combination thereof. Probably the most common alkaline agent is sodium hydroxide NaOH, which is also called caustic soda. The alkaline liquid generally contains about 2-4% (w/w) of the alkaline agent(s), for example about 2%.

According to an embodiment, the adhesive force of the adhesive layer is reduced at an elevated temperature. According to at least some embodiments, the adhesive layer exhibits reduction in its adhesion force at the temperatures above 70° C., or preferably above 65° C., or more preferably above 60° C. At least in some embodiments reduction in adhesion force is such that a label attached with the adhesive layer to an article starts detaching from an article at an elevated temperature (for example in alkaline water). Peel adhesion corresponds to a force required to detach an self-adhesive label. At room temperature the peel adhesion may be up to 25 N/25 mm. At washing conditions, for example at 65° C. or 75° C., the peel adhesion may be 2-12 or 5-10 times less, for example 1-5 cN/25 mm, or 0-5 cN/25 mm or even less, such as 0-2.5 cN/25 mm. The peel adhesion may be expressed as a peel value at an angle of 180° (or 90°). Low speed release force is expressed as the average result for the strips tested in centiNewton per 50 mm width (FINAT Test Method 3). High speed release force is expressed as the peak or average result for the strips tested in centiNewtons (cN) per 25 mm width (FINAT Test Method 4).

The contamination of the wash solutions and the recycled container material should be avoided. Further it would be desirable that the washed labels do not stick to each other and form large agglomerates which could block the equipment and slow down the process.

One embodiment provides a washable printed linerless face laminate wherein the pressure sensitive adhesive is sensitive to the washing conditions.

One embodiment provides a washable printed linerless face laminate comprising the following layers in the following order:

- a release layer comprising a release agent,
- a second layer comprising a thermoplastic polymer,
- a second adhesive layer,
- a first layer comprising a thermoplastic polymer or fiber-based material, and
- first adhesive layer comprising a pressure sensitive adhesive sensitive to the washing conditions, wherein the print is on one or more printable surface(s) between the first layer and the second layer.

One embodiment provides a method for producing a washable printed linerless face laminate, the method comprising providing a printable laminate having one or more printable surface(s) and multiple layers in the following order:

- a first layer comprising a thermoplastic polymer or fiber-based material,
- a first adhesive layer comprising a pressure sensitive adhesive sensitive to the washing conditions,
- a release layer comprising a release agent, and
- a second layer comprising a thermoplastic polymer;

printing on the one or more printable surface(s);
separating
the first layer and the first adhesive layer, from
the release layer and the second layer;
rearranging
the release layer and the second layer
on top of
the first layer and the first adhesive layer, with the release layer on top of the construction; and laminating the first layer and the second layer together with a second adhesive layer, to form the washable printed linerless face laminate.

One embodiment provides a printed linerless face laminate obtained with said method.

The preparation process of the linerless face laminate produces an end product having a release layer, such as silicone layer, on top of the face laminate, and a pressure sensitive adhesive sensitive to the washing conditions on the other side of the face laminate. The release layer may also be added separately. The construction of the face laminate or the label enables winding of the self-adhesive, linerless label web onto itself. The label roll is unwound in order to cut separate labels from the label web and/or to provide self-adhesive labels to an article. According to embodiments, the layer next to the adhesive layer, when the label web is wound to a roll, is a release agent layer. The release agent layer wound next to the adhesive layer enables the label web to be releasably wound on itself. The release agent layer on one side of the face stock is arranged to form a release layer for the self-wound linerless label according to embodiments. The release agent layer also facilitates the handling of the face laminate web in the process as the reduced coefficient of friction provides smoother running.

The feature that the print is on a printable surface between the first layer and the second layer provides an effect of the print being protected against any wearing or contamination during the production, storage, transportation and use. Further, during the washing of the labels the feature provides an effect that the print ink will not be washed off to contaminate the washing solution and/or the recyclable materials of the containers.

The feature that the first and the second layer comprise plastic material only, i.e. no paper layers are present, provides an effect that said layers will not disintegrate in the wash and they will protect the print layer. Also no disintegrating paper material is present to contaminate the washing solution.

In the washing process the first adhesive comprising pressure sensitive adhesive sensitive to the washing conditions is detached from the labelled item, for example a bottle. As the adhesion of the first adhesive decreases at the washing process comprising increased temperature of at least 50° C. and generally alkaline conditions, it provides a primary effect of detaching the label from the item. Further, the feature that the adhesion of the adhesive is decreased provides another effect of preventing the plurality of separate labels from sticking to each other by the adhesives and forming agglomerates.

The feature that the first adhesive has a low solubility in the washing conditions provides an effect of preventing the washing liquid from contaminating with dissolved adhesive. This prolongs the lifetime of the washing solution and also prevents the contamination of the recyclable items, such as bottles.

In the washing process the release agent layer provides a further effect of preventing the washed labels from sticking to each other. As the other side of the label contains an adhesive there is a risk of two or more of the labels adhering together and forming large clusters. Further, as the labels have a print between two film layers, they are also stiffer. Also thick plastic layers, unlike paper layers, do not disintegrate in water and are therefore more likely to form stiff clusters. When such stiff labels form clusters in the wash, there is higher risk of blocking of the equipment and the removal of such stiff blockages is difficult.

The combination of the features of the deactivatable adhesive, the release layer on the opposite side and the print between the plastic layers in the washable label product provides an effect of decreasing problems in the washing process. The contamination of the washing solution with dissolving contaminating agents and simultaneously the blocking of the equipment with detached labels and formations of clusters which are difficult to remove are all prevented. The washing process may continue longer without breaks and the process also saves the washing solution.

In the washing conditions in the alkali solution the peel value may be in the range of 0-1 N/25 mm, for example 0-0.5 N/25 mm, or 0-0.1, even 0-0.05 N/25 mm at 80° C., 75° C., 65° C. or 50° C.

In one embodiment the peel value of the pressure sensitive adhesive is less than 1 N/25 mm at 80° C. In one embodiment the peel value of the pressure sensitive adhesive is less than 1 N/25 mm at 65° C. In one embodiment the peel value of the pressure sensitive adhesive is less than 1 N/25 mm at 50° C.

In one embodiment the peel value of the pressure sensitive adhesive is less than 0.5 N/25 mm at 80° C. In one embodiment the peel value of the pressure sensitive adhesive is less than 0.5 N/25 mm at 65° C. In one embodiment the peel value of the pressure sensitive adhesive is less than 0.5 N/25 mm at 50° C.

In one embodiment the peel value of the pressure sensitive adhesive is less than 0.2 N/25 mm at 80° C. In one embodiment the peel value of the pressure sensitive adhesive is less than 0.2 N/25 mm at 65° C. In one embodiment the peel value of the pressure sensitive adhesive is less than 0.2 N/25 mm at 50° C.

In one embodiment the peel value of the pressure sensitive adhesive is less than 0.1 N/25 mm at 80° C. In one embodiment the peel value of the pressure sensitive adhesive is less than 0.1 N/25 mm at 65° C. In one embodiment the peel value of the pressure sensitive adhesive is less than 0.1 N/25 mm at 50° C.

In one embodiment the peel value of the pressure sensitive adhesive is less than 0.05 N/25 mm at 80° C. In one embodiment the peel value of the pressure sensitive adhesive is less than 0.05 N/25 mm at 65° C. In one embodiment the peel value of the pressure sensitive adhesive is less than 0.05 N/25 mm at 50° C.

In one embodiment the peel adhesion at 80° C. is at least 5-100 times less than the peel adhesion at room temperature. In one embodiment the peel adhesion at 80° C. is at least 10-200 times less than the peel adhesion at room temperature. In one embodiment the peel adhesion at 80° C. is 50-300 times less than the peel adhesion at room temperature.

In one embodiment the pressure sensitive adhesive has a low solubility to an aqueous alkaline solution at increased temperature. In one embodiment the pressure sensitive adhesive has a solubility of less than 25% to an aqueous alkaline solution at temperature of at least 50° C. In one embodiment the pressure sensitive adhesive has a solubility of less than 25% to an aqueous alkaline solution at temperature of at least 65° C. In one embodiment the pressure sensitive adhesive has a solubility of less than 25% to an aqueous alkaline solution at temperature of at least 80° C. In one embodiment the pressure sensitive adhesive has a solubility of less than 10% to an aqueous alkaline solution at temperature of at least 50° C. In one embodiment the pressure sensitive adhesive has a solubility of less than 10% to an aqueous alkaline solution at temperature of at least 65° C. In one embodiment the pressure sensitive adhesive has a solubility of less than 10% to an aqueous alkaline solution at temperature of at least 80° C. In one embodiment the pressure sensitive adhesive has a solubility of less than 5% to an aqueous alkaline solution at temperature of at least 50° C. In one embodiment the pressure sensitive adhesive has a solubility of less than 5% to an aqueous alkaline solution at temperature of at least 65° C. In one embodiment the pressure sensitive adhesive has a solubility of less than 5% to an aqueous alkaline solution at temperature of at least 80° C.

The alkaline solution refers to a 2-4% aqueous alkaline solution, usually 1.5-2%, for example a 2% aqueous solution of NaOH.

The adhesive layer 102 is releasably attached to a release layer. This release layer 103, or release coating, comprises release agent. In one example the release layer 103 consists of the release agent. In one embodiment the release agent is non-silicone release agent. In one embodiment the release agent comprises silicone, such as UV-curable silicone.

In one example the release layer 103 consists of silicone. The silicone may be for example 100% solid curable, solvent based or emulsion based silicone. It may be obtained with poly-addition of polycondensation reaction. Silicone release coating systems may be applied and further dried and cured to achieve a cross-linked silicone release layer. For example the silicone layer may be cured by moisture-curing, heat-curing, photoinitiated curing by e.g. ultraviolet, LED, electron beam or any combination of different mechanisms. In one embodiment the silicone is UV-curable (radical or cationic) silicone. In one embodiment the silicone is thermal curable silicone. UV curable silicone may be preferred if low melting plastic film substrates are used, such as low density polyethylene or polypropylene. The silicone has a density of 965 kg/m$^3$. The surface energy of silicone is generally in the range of 18-25 mJ/m$^2$. The surface energy has a positive effect on the behaviour of removed labels in the wash in the washing liquid phase. For example by using silicone it is possible to obtain labels which will float in the wash.

The preparation process of the linerless face laminate produces an end product having a silicone layer on top of the face laminate, and a pressure sensitive adhesive on the other side of the face laminate. The silicone layer may also be added separately, for example to a single-layered facestock, and the print layer may be the next layer under the silicone. The construction of the face laminate or the label enable rolling the self-adhesive, linerless label web onto itself. The label roll is unwound in order to cut separate labels from the label web and/or to provide self-adhesive labels to an article. According to embodiments, the layer next to the adhesive layer, when the label web is wound to a roll, is a silicone layer. The silicone layer wound next to the adhesive layer enables the label web to be releasably wound on itself. The silicone layer on one side of the face stock is arranged to form a release layer for the self-wound linerless label according to embodiments. The silicone layer also facilitates the handling of the face laminate web in the process as the reduced coefficient of friction provides smoother running.

In the washing process the silicone layer provides an effect of preventing the washed labels from sticking to each other. As the other side of the label contains an adhesive there is a risk of two or more of the labels adhering together and forming large clusters. Further, as many label types contain multiple layers, such as ones having a print between two film layers, they are also stiffer. Also thick plastic layers, unlike paper layers, do not disintegrate in water and are more likely to form stiff clusters. When such stiff labels form clusters in the wash, there is higher risk of blocking of the equipment and the removal of such stiff blockages is difficult.

It is also possible to control the density of the label having the silicone and the pressure sensitive adhesive in the same label, as these layer are substantially thin. The density has an effect to the behaviour of the label in the washing solution.

As the print is on a printable surface between the first layer and the second layer, it provides an effect of being protected against any wearing or contamination during the production, storage, transportation and use. Further, during the washing of the labels the print ink will not be washed off to contaminate the washing solution and/or the recyclable materials of the containers.

The release layer comprises a release value which is expressed as a release force as centiNewtons (cN) per mm width measured at the standard test conditions of 23° C.±2° C. and 50% RH±5% RH. Methods for determining the release force are disclosed for example in FINAT Test Methods 3 and 4 (FINAT Technical Handbook 8th edition, 2009). According to an embodiment the release layer comprises low release silicon, or silicon of a low release value. Low release or low release value corresponds to low force required to detach the release layer from the layer next to it. In other words relatively low force is required to detach the release layer from the layer next to it. According to another embodiments the release layer comprises high release silicon, or silicon of a high release value. High release or high release value corresponds to a high force required to detach the release layer form the layer next to it. In other words relatively high force is required to detach the release layer from the adhesive layer. The release force may be dependent on many factors, for example neighbouring surfaces or materials, humidity, temperature and alike. Release level is measured, for example, at 2 inches (51 mm) width, 300 inches (762 mm) per minute at 180 degree peel. The release level may be for example in the range of 4-15 g/50 mm for low-speed release product, or in the range of 10-30 g/mm for high-speed release product.

Conventional silicone release coating systems consists of a reactive silicone compound, a cross-linker, a catalyst, and optionally an inhibitor. The silicone coating compositions may be solvent-based, emulsion-based or solventless (100% solid composition). Silicone content may be less than 2 g/m$^2$, less than 1.5 g/m$^2$ or less than 1 g/m$^2$ (dry grammage). The amount of silicone may be at least 0.01, 0.02 or 0.1 g/m$^2$. The amount of silicone may be between 0.4 and 1.5 g/m$^2$ or between 0.6 and 1 g/m$^{2}$' for example 1 g/m$^2$.

The second layer 104 comprises at least one thermoplastic polymer, such as a polymer selected from polyolefins, polyesters, cyclic olefin polymers or copolymers or the like. The second layer 104 may also comprise or further comprise at least one polymer based on or derived from a thermoplastic polymer. The content of said thermoplastic polymer or the polymer derived from said thermoplastic polymer in the layer may be for example in the range of about 10-100% (w/w). The second layer may be a plastic layer. If the layer consists of said polymer or substantially consists of said polymer, the content of the polymer in the layer may be in the range of about 95-100% (w/w), more particularly about 98-100% (w/w), or even about 99-100% (w/w). If the layer contains several polymers, the content of a single type of polymer in the layer may be in the range of about 20-80% (w/w), or about 30-70% (w/w), or about 40-60% (w/w) or about 50% (w/w). In one embodiment the second layer does not contain paper.

In one embodiment the second layer comprises polyester, for example at least 80% of polyester, or at least 90% of polyester. In many cases the PET films contain 100% of PET. In one embodiment the second layer comprises polyolefin, for example at least 70% of polyolefin, or at least 80% of polyolefin. In a case of polyolefin/polystyrene coextrusion the content of polyolefin may be in the range of 40-70%.

The second layer may comprise a polymer selected from for example polyethylene, polypropylene, polyethylene terephthalate, polylactic acid, polystyrene, polyvinyl chloride, cyclic olefin (co)polymer, copolymers, derivatives and coextrusion blends thereof.

The second layer 104 may comprise a monolayer film or a multilayer film and it has a first side and a second side. The second layer 104 may also be called as second film layer and it acts as a liner for the laminate. In one embodiment the second layer 104 comprises a monoaxially oriented film. In one embodiment the second layer 104 is a monoaxially oriented film or consists of it. In one embodiment the second layer 104 is a thermoplastic film, or film derived from one or more thermoplastic polymer. The first side of the second layer 104 faces the releasing coating layer 103. In one embodiment the second side of the second layer has a printable surface. The second layer 104 may have a thickness in the range of about 10-50 μm, for example in the range of about 10-40 μm, or 10-30 μm. The second layer 104 may be machine-direction (MD) oriented or it may be cross-direction (CD) oriented. The second layer may be non-annealed or it may be annealed only to a very low extent, which results in a shrinkable layer. In one embodiment the haze of the second layer is less than 10%, preferably less than 5%. When the haze is low also the adhesives used should be clear or transparent. In one embodiment the haze of the face laminate is less than 10%, preferably less than 5%. In one embodiment the second layer having the printable surface is transparent or substantially transparent. When printing on the second layer, especially when using a metallizing printing or the like, in the final product the printing is visible through the transparent second layer. As the surface of the second layer is smooth, also the side of the print on the visible side is smooth, which provides especially smooth appearance of the print. For example in the case of metallizing print it may have an appearance of a mirror-like print. If the print is seen from the printed side of the layer it has more of a mat type of appearance, for example an orange peel effect.

Annealing refers to a thermal treatment involving heating a material to above its critical temperature, maintaining a suitable temperature, and then cooling. This heat-setting may be used to anneal the internal stresses generated to a film during the stretching process. The annealing process decreases the modulus and stiffness of the films.

In one embodiment the second layer comprises a shrinkable monoaxially oriented film having an areal shrinkage in the direction of the orientation of at least 5% at 80° C., for example at least 10%. In one embodiment the second layer comprises a shrinkable monoaxially oriented film having an areal shrinkage in the direction of the orientation in the range of 5-60% at 80° C. or in the range of 10-60% or 20-60%. The areal shrinkage may be defined for example by using standards AST D1204 or ASTM D2732, for example using liquid, such as water, as the heating medium at 80° C. for at least 3 minutes, or using air as the heating medium at 80° C. for at least 3 minutes. In one embodiment the tensile modulus (ASTM D882) of the second layer in the machine direction is 0.8-3.0 GPa after immersion in water at 80° C. for at least 3 minutes. As a result, during the washing process of the label, the mono-axially oriented layer will shrink and tend to curl and the label will wash off.

In one embodiment the second layer comprises a non-annealed biaxially oriented film. In one embodiment the second layer comprises an annealed biaxially oriented film. The film may comprise for example polypropylene, PET, polystyrene, polylactic acid or COC.

The orientation of the film derives from the manufacturing process thereof. Through the machine direction orientation (MDO) process, the film is uniaxially stretched in the machine direction of the film i.e. in the direction of the movement of the film. Stretching is normally done by means of a machine direction orienter via rolls by gradually increasing speed or by rapidly increasing speed. The rolls are heated sufficiently to bring the film to a suitable temperature, which is normally below the melting temperature ($T_m$), or around the glass transition temperature ($T_g$) of the polymer.

Transverse direction orientation (TDO), also referred to as cross direction orientation (CDO), means the direction perpendicular to a movement of the film.

Monoaxial orientation, also referred to as uniaxial orientation, refers to the stretching provided only in one direction, either in machine direction or cross (transverse) direction.

Biaxial orientation (BO) refers to a film oriented (stretched) both in machine direction and in cross direction. The biaxial orientation may be done through a tenter frame process which creates different degrees of orientation in the MD and CD directions. Biaxial films are most often first stretched in the machine direction like MDO films, and then stretched in transverse direction via a tenter frame or possibly also using a simultaneous tentering process. The films may also be oriented by using so called double bubble tubular stretching process which produces similar degrees of orientation in both the MD and TD directions.

A ratio of total film thickness before and after stretching is called a "stretch ratio" (sometimes also called a draw ratio) or "stretching ratio" (or drawing ratio, DR). In other words, stretch ratio is a ratio of non-oriented (undrawn) film thickness to the oriented (stretched) film thickness. The non-oriented film thickness is the thickness after extrusion and subsequent chilling of the film. When stretching the facestock, the thickness of the facestock may diminish in the same ratio as the facestock stretches or elongates. For example, a facestock having thickness of 100 micrometres before machine direction orientation (MDO) is stretched by a stretch ratio of 5. After the machine direction orientation the facestock has a fivefold diminished thickness of 20 micrometers.

In one embodiment the stretch ratio of a film in cross direction is in the range of 2-7. In one embodiment the stretch ratio of a film in cross direction is in the range of 3-6, for example 4-5.

The stretch ratio of a film in machine direction may be little higher. In one embodiment the stretch ratio of a film in machine direction is in the range of 2-10. In one embodiment the stretch ratio of a film in cross direction is in the range of 3-8.

The total thickness of the face laminate, for example a face laminate having at least the first film, the second adhesive layer and the second film together may be in the range of 20-100 μm. In one embodiment the total thickness of the face laminate having at least the first film, the second adhesive layer and the second film together is in the range of 25-80 μm, for example 30-50 μm, or even 30-60 μm. Thinner laminates (less than 20 μm) would not be stiff enough and might disintegrate in the wash, and thicker ones might have problems in the processability and in the handling of the laminates. The first film may have a thickness in the range of about 10-60 μm, for example in the range of about 10-40 μm, or 10-30 μm, or even or 10-20 μm. Similarly the second film may have a thickness in the range of about 10-60 μm, for example in the range of about 10-40 μm, or 10-30 μm, or even or 10-20 μm.

In one example a machine direction oriented film has a thickness in the range of 20-25 μm.

Shrinkable films may be used for example for wrap around labels. After orienting (stretching) the plastic film is not heat set, i.e. not annealed, in order to provide shrinkage for the film. After stretching at elevated temperature the oriented film is immediately cooled by passing the film through cooling rolls. Cooling temperature is preferably between 40 and 100° C., preferably between 50 and 80° C., and most preferably between 50 and 60° C. Consequently, subsequent application of heat causes the oriented film to relax and the oriented film may return substantially back to its original unstretched dimensions. Thus, machine direction oriented films primarily shrink in the machine direction.

Shrink films may be applied to an article with a combination of seaming and shrink technique. Preferably a machine direction of the oriented film extends circumferentially around the item. A shrinkable film as used herein refers to a film which is arranged to shrink in response to exposure to elevated temperature.

The facestock, facestock layer(s) i.e. adhesive and/or print receiving layer(s) may be surface treated by known methods in the art, such as flame treatment, corona treatment, plasma treatment, in order to enhance for example adhesion of the adhesive and/or printing inks.

In one embodiment the monoaxially oriented film comprises polyester, or it comprises at least one polymer derived from polyester. Examples of polyesters include for example homopolymers, such as polyglycolic acid, polylactic acid (PLA), polycaprolactone (PCL), polyhydroxyalkanoate (PHA) and polyhydroxybutyrate (PHB); aliphatic copolymers, such as polyethylene adipate (PEA) and polybutylene succinate (PBS); semi-aromatic copolymers, such as polyethylene terephthalate (PET), polyethylene terephthalate glycol modified (PETG), polybutylene terephthalate and polytrimethylene terephthalate (PTT); or aromatic copolymers such as Vectran.

In one embodiment the monoaxially oriented film comprises polyethylene terephthalate (PET), or it comprises at least one polymer derived from polyethylene terephthalate. Polyethylene terephthalate tends to shrink at washing temperature. In one embodiment said monoaxially oriented film comprises polyethylene terephthalate glycol modified (PETG).

Polyethylene terephthalate (PET) is a thermoplastic polymer resin, which can be used in container for beverage, food and other liquids as a recyclable material. Polyethylene terephthalate glycol modified (PETG) refers to PET wherein cyclohexane dimethanol has been added to the polymer backbone in place of ethylene glycol. PETG is clear amorphous thermoplastic which can be used in several molding applications. PET can also be modified with isophthalic acid which replaces some of the 1,4-(para-) linked terephthalate units. This creates an angle in the PET chain, interfering with crystallization and lowering the polymer's melting point. PET has a glass transition temperature of about 70° C.

In one embodiment the monoaxially oriented film comprises polyvinyl chloride, or it comprises at least one polymer derived from polyvinyl chloride. Polyvinyl chloride (PVC) is a polymer produced by polymerization of the monomer vinyl chloride. The product of the polymerization process is unmodified PVC. Before PVC can be made into finished products, it always requires conversion into a compound by the incorporation of additives such as heat stabilizers, UV stabilizers, lubricants, plasticizers, processing aids, impact modifiers, thermal modifiers, fillers, flame retardants, biocides, blowing agents and smoke suppressors, and, optionally pigments (Wikipedia). PVC has a glass transition temperature of about 80° C.

In one embodiment the monoaxially oriented film comprises polylactic acid (PLA), or it comprises at least one polymer derived from polylactic acid. Polylactic acid may also be called polylactide.

Polylactide or polylactic acid (PLA) has benefits due to its eco-friendly nature like development from renewable materials and biodegradability. Polylactide is a biodegradable, thermoplastic, aliphatic polyester derived from lactic acid obtained from renewable or non-renewable resources, e.g. corn-starch based lactic acid. Polylactide has initially partially crystalline structure containing both crystalline and amorphous regions. Polylactide may also be totally amorphous. It can be processed in similar manner than many thermoplastics into fibres, films or other products manufactured by conventional melt processing techniques. Due to the chiral nature of lactic acid and different cyclic diesters, lactide stereoisomers, several distinct forms of polylactide exists such as homopolymer of L-lactide PLLA and stereocopolymers of L-lactide and D-lactide P(L/D)LA or L-lactide and DL-lactide P(L/DL)LA. Polylactide has a glass transition temperature of about 60-65° C.

In one embodiment the monoaxially oriented film comprises polycaprolactone (PCL), or it comprises at least one polymer derived from polycaprolactone.

In one embodiment the monoaxially oriented film comprises polystyrene (PS), or it comprises at least one polymer derived from polystyrene. Polystyrene (PS) is a synthetic aromatic polymer made from the monomer styrene. Polystyrene is a thermoplastic polymer having a glass transition temperature of about 100° C. It is in a solid state at room temperature but flows if heated above the glass transition temperature. It becomes rigid again when cooled. This temperature behavior is exploited for extrusion, and also for molding and vacuum forming, since it can be cast into molds with fine detail.

Suitable examples of polymer derived from polystyrene include styrene block-copolymers, such as SBS, SIS, SEBS, SEPS, SIBS, SEP, SEEPS and the like. One example discloses a coextrusion of GPPS/SBC copolymer layers with olefin elastomers or plastomers. The resultant film will have a density less than 1.0 g/cm$^3$.

In one embodiment the monoaxially oriented film comprises polystyrene in admixture with a general purpose polystyrene (GPPS). In one embodiment said monoaxially oriented film comprises polystyrene in admixture with a styrene block-copolymer.

In one embodiment the monoaxially oriented film comprises cyclic olefin polymer (COP) or cyclic olefin copolymer (COC). In one embodiment the monoaxially oriented film comprises cyclic olefin (co)polymer. (Co)polymer refers to polymers based on one type of monomers and to polymers based on more than one type of monomer.

Cyclic olefin copolymers are amorphous polymers based on different types of cyclic monomers. Cyclic olefin polymers and copolymers are produced by chain (co)polymerization of cyclic monomers. Such polymeric materials using a single type of monomer are named cyclic olefin polymers (COP).

Cyclic olefin polymers may be extruded with cast or blown film equipment. Cyclic olefin polymers may also be used as modifiers in monolayer or multilayer films to provide properties not delivered by base resins, such as polyethylene. Examples of advantageous COC properties include thermoformability, shrink, deadfold, easy tear, enhanced stiffness, heat resistance and higher moisture barrier. The optical properties, such as transparency, low birefringence, high Abbe number and high heat resistance, of cyclic olefin polymers are advantageous and in many ways similar to glass. Cyclic olefin polymers in general have a wide range of glass transition temperatures in a range of about 80-180° C.

Examples of cyclic olefins include cyclobutenes, cyclopentenes, norbornenes, vinylcyclohexane and dicyclopentadiene.

Linerless face laminates with different densities may be used for different purposes. If the films comprises polyethylene terephthalate, polyethylene terephthalate glycol modified, polylactic acid or polystyrene, the density of the final face laminate construction is generally greater than 1.0

$g/cm^3$, for example in the range of 1.05-1.5 $g/cm^3$. Polystyrene has a density of about 1.05 $g/cm^3$, polylactic acid has a density of about 1.25 $g/cm^3$, and PVC has a density in the range of about 1.30-1.40 $g/cm^3$. This is close to the density of generally used PET container so such film should preferably not be used as a washable label for PET containers because it cannot be easily separated from the polyester of the bottles during the washing process.

In one embodiment the printed face laminate has a total average density of less than 1.0 $g/cm^3$. In one embodiment the printed face laminate has a total average density in the range of 0.5-0.99 $g/cm^3$. In one embodiment relating especially to clear films the printed face laminate has a total average density in the range 0.9-0.98 $g/cm^3$. Such face laminates are suitable for example for labelling recyclable polyester items, such as PET containers.

In one embodiment the printed face laminate has a total average density of at least 1.0 $g/cm^3$. In one embodiment the printed face laminate has a total average density in the range of 1.05-1.5 $g/cm^3$. Such face laminates are suitable for example for labelling glass bottles.

In one embodiment the monoaxially oriented film comprises thermoplastic polyolefin, or it comprises at least one polymer derived from thermoplastic polyolefin. Examples of thermoplastic polyolefins include polyethylene, polypropylene, polymethylpentene, polybutene-1. monoaxially.

In one embodiment the monoaxially oriented film comprises polyethylene, or it comprises at least one polymer derived from polyethylene. Polyethylene is a thermoplastic polymer which may be classified into several different categories based on density and branching. Examples of such categories include ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE), low-density polyethylene (LDPE), very-low-density polyethylene (VLDPE) and chlorinated polyethylene (CPE). The melting point and glass transition temperature may vary depending on the type of polyethylene. For medium- and high-density polyethylene the melting point is typically in the range of 120-180° C., and for average low-density polyethylene in the range of 105-115° C. The glass transition temperature of LDPE is about −125° C.

In one embodiment the monoaxially oriented film comprises polyethylene mixed with one or more polypropylene. In one embodiment the monoaxially oriented film comprises polyethylene mixed with one or more cyclic olefin (co) polymer. In one embodiment the monoaxially oriented film comprises two or more types of polyethylene.

In one embodiment the monoaxially oriented film comprises polypropylene, or it comprises at least one polymer derived from polypropylene. Polypropylene is a thermoplastic polymer having a glass transition temperature of about −20° C. (atactic polypropylene) or about 0° C. (isotactic polypropylene).

Examples of suitable polypropylenes or polymers derived from polypropylene include PP-homopolymers, random PP copolymers, PP block copolymers, PP terpolymers, PP elastomers and PP plastomers. In one embodiment said shrinkable uniaxially oriented film comprises two or more types of polypropylene.

Certain films, such as ones based on PVC, PLA, PET or PETG may be used on glass containers, such as bottles, where the label is designed to sink. Alternatively one layer may be as above and another layer may be a mixture of polyolefins, COC, or a layer of PS and styrene-block copolymers.

If the labels are designed to float the layers may contain polyolefin, a mixture of polystyrene and SBC, or possibly even voided-PET films or these coextruded to PS layers. Such floating labels may be used for example for labelling PET bottles, but they may also be used for labelling glass bottles.

For PET containers preferably a shrinkable polyolefin film is used in said second layer. In this case the face laminate construction should have density less than 1.0 $g/cm^3$, for example in the range of 0.90-0.98 $g/cm^3$. This will cause the label to float in the washing process and the PET of the bottle to sink, thus allowing for efficient recovery and recycling of the PET flakes.

In one embodiment the second layer 104 comprises polypropylene film which is annealed and therefore non-shrinkable. In one embodiment the areal shrinkage of such non-shrinkable polypropylene is less than 5%, for example less than 2%, at about 80° C., for example in the range of 0.5-2.0%. In this case the second layer may be mono-axially oriented or biaxially oriented. In this case the whole label construct may be based on polypropylene. This is of advantage for example in the case of non-washable, permanent labels to be attached to polyolefin containers, such as polyethylene or high density polyethylene (HDPE) or polypropylene containers. Polypropylene is compatible with polyethylene, and using such similar polymers provides a good adherence of the label to the container. Polypropylene is less stiffer than for example polyester so this results in less flagging or winging on curved bottles. Certain types of containers, such as for example shampoo bottles, require such flexibility. With the label comprising also polypropylene in this case, the label and the container may be fully recycled together and the polymer obtained re-used. This is not possible if the label is made of PET.

In one example at least one of label layers, or one of multilayer structure layers, may further comprise minor components, such as inorganic fillers, pigments, other organic or inorganic additives in order to provide desired properties, such as appearance (opaque or coloured films), durability and processing characteristics. Examples of useful minor components include calcium carbonate, titanium dioxide, antioxidant compounds, optical brighteners, anti-static aids and processing aids.

The laminate 100 described above may be wound into a laminate roll, generally a web, for storage and transportation. In one embodiment the laminate 100 has a further second adhesive layer 105 attached to the second side of the second layer 104. During the storage the second adhesive layer 105 is in contact with the first layer 101, which may be printed. If the adhesive in the second adhesive layer is not pressure sensitive or heat activated, said roll tolerates high temperatures and mechanical stress and the layers will not stick together. In another specific embodiment the laminate does not contain a second adhesive layer.

In general, when providing the laminate 100 as a laminate roll, the second adhesive must be activatable, as the laminate 100 is usually provided as wound into a roll. The mechanism of activating the second adhesive which acts as a re-laminating adhesive may be based for example on temperature or water addition.

In one example the activatable adhesive comprises a solid polymer whose viscosity drops when heated to a level where it can wet the substrate and gives a sufficient bond when cooled. In case of wash-off structure the activation temperature has to be lower than the temperature were the film(s) starts to shrink.

In one example the activatable adhesive comprises a polymer based on a soft amorphous phase and non-tacky crystalline phase. The activation would tack place when the crystalline phase would melt allow the adhesive to wet the substrate.

In one example the activatable adhesive comprises a PSA type adhesive which is immobilized with a non-tacky layer. This could be a water soluble layer based on natural or synthetic polymers (activated by $H_2O$) or a heat activated layer that melts and is adsorbed in the PSA, for example a wax type of layer.

Said laminate may be used for producing a label product. The "label" as used herein refers to a label laminate or face laminate having multiple layers. Such a printable face laminate may be provided as a roll. A method for producing a printed linerless face laminate comprises printing on the printable surface of the laminate described above, separating from the laminate the first layer, and the first adhesive layer comprising a pressure sensitive adhesive, from the second layer, rearranging the second layer and the second adhesive layer on top of the first layer, and the first adhesive layer comprising a pressure sensitive adhesive, and laminating the first layer and the second layer together with a second adhesive layer, to form the printed face laminate.

One embodiment provides a printed face laminate 110 having a print layer 106 on a printable surface, the label comprising the following layers in the following order:

- a release layer 103 comprising a release agent,
- a layer comprising a thermoplastic polymer 104,
- a second adhesive layer 105,
- a layer comprising a thermoplastic polymer 101 or fiber-based material, and
- a first adhesive layer comprising a pressure sensitive adhesive 102. In one embodiment the first layer 101 has a printable surface. In one embodiment the second layer 104 has a printable surface. The release layer, such as a silicone layer, on the top may be a result of the preparation process from the laminate 100. Another option is to add the release layer on top of the ready printed face laminate or facestock using any known method for applying and curing the release agent, such as silicone.

In the construction the print is on one or more printable surface(s) between the first layer and the second layer. In one embodiment at least one of the first layer and the second layer comprises a non-annealed monoaxially oriented film. In one embodiment the non-annealed monoaxially oriented film is a shrinkable monoaxially oriented film.

The facestock may also be a single layer facestock. One embodiment provides a printed face laminate having a print layer on a printable surface, the label comprising the following layers in the following order:

- a release layer comprising a release agent,
- a layer comprising a thermoplastic polymer or fiber-based material, and the printable surface,
- an adhesive layer. In this embodiment the release agent layer has been added on top of the printed film layer comprising a thermoplastic polymer or fiber-based material, and the printable surface. The print may be on top of the film layer below the release agent layer or between the film layer and the adhesive layer.

One embodiment provides a printed face laminate having a print layer on a printable surface, the label comprising the following layers in the following order:

- a release layer comprising silicone,
- a layer comprising a thermoplastic polymer or fiber-based material, and the printable surface,
- an adhesive layer.

In one embodiment the first layer comprises a shrinkable monoaxially oriented film and the second layer comprises a monoaxially oriented film having an areal shrinkage in the direction of the orientation of less than 5% at 80° C. Such a second layer may be substantially non-shrinkable.

In one embodiment the second layer comprises a shrinkable monoaxially oriented film and the first layer comprises a monoaxially oriented film having an areal shrinkage in the direction of the orientation of less than 5% at 80° C. Such a first layer may be substantially non-shrinkable.

In one embodiment the first layer comprises a shrinkable monoaxially oriented film and the second layer comprises a shrinkable monoaxially oriented film.

In one embodiment the first layer comprises a machine direction oriented (MDO) film. In one embodiment the first layer comprises a non-annealed machine direction oriented film. In one embodiment the first layer comprises a cross direction oriented (CDO) film. In one embodiment the first layer comprises a non-annealed cross direction oriented film.

In one embodiment the second layer comprises a machine direction oriented (MDO) film. In one embodiment the second layer comprises a non-annealed machine direction oriented film. In one embodiment the second layer comprises a cross direction oriented (CDO) film. In one embodiment the second layer comprises a non-annealed cross direction oriented film.

In one embodiment the first layer comprises a non-annealed machine direction oriented film, and the second layer comprises a non-annealed film selected from machine direction oriented film, cross direction oriented film and biaxially oriented film.

In one embodiment the first layer comprises a non-annealed film selected from machine direction oriented film, cross direction oriented film and biaxially oriented film, and the second layer comprises a non-annealed machine direction oriented film.

In one embodiment the first layer comprises a cross direction oriented (CDO) film and the second layer comprises a machine direction oriented (MDO) film.

In one embodiment the first layer comprises a machine direction oriented (MDO) film and the second layer comprises a cross direction oriented (CDO) film. This is advantageous especially when a round item, such as a bottle or the like, is labelled. The label is generally fed onto the circumferential direction of the cylindrical item in the machine direction so when a cross-direction oriented layer is on the bottom attached to the surface of the item, it will lift away from the item during the washing process. However it will not curl strongly into a tight cylindrical tube which can get stuck in the washing apparatus and which is difficult to remove later.

If the face laminate is shrinkable in two perpendicular directions it will form in an elevated temperature two perpendicular curling forces. These forces should be overall higher than the adhesive force between the face laminate and a labelled item containing the face laminate attached to it. The shrink force, as a function of temperature, would be designed so as to give a maximum effect at the washing temperature and minimal to no shrinking at lower temperatures, for example less than 5%, less than 2%, or less than 1% or about 0% at room temperature. With two shrinkable films, shrinking in 90 degree angle to each other, the label will not be rolled up into a pipe form and will thus be less problematic for the washing process. In the wash the label will be finally attached to the container only from a single point rather than from a line and therefore it will be detached easily.

In one embodiment the first layer comprises a biaxially oriented film. In one embodiment the second layer comprises a biaxially oriented film. In one embodiment said biaxially oriented film is non-annealed. In one embodiment said biaxially oriented film is annealed. In one embodiment the first layer comprises a biaxially oriented film and the second layer comprises a monoaxially oriented film. In one embodiment the first layer comprises a monoaxially oriented film and the second layer comprises a biaxially oriented film. In one embodiment the first layer comprises a biaxially oriented film and the second layer comprises a machine direction oriented (MDO) film. In one embodiment the first layer comprises a biaxially oriented film and the second layer comprises a cross direction oriented (CDO) film. In one embodiment the first layer comprises a cross direction oriented (CDO) film and the second layer comprises a biaxially oriented film. In one embodiment the first layer comprises a machine direction oriented (MDO) film and the second layer comprises a biaxially oriented film.

Figure 6:
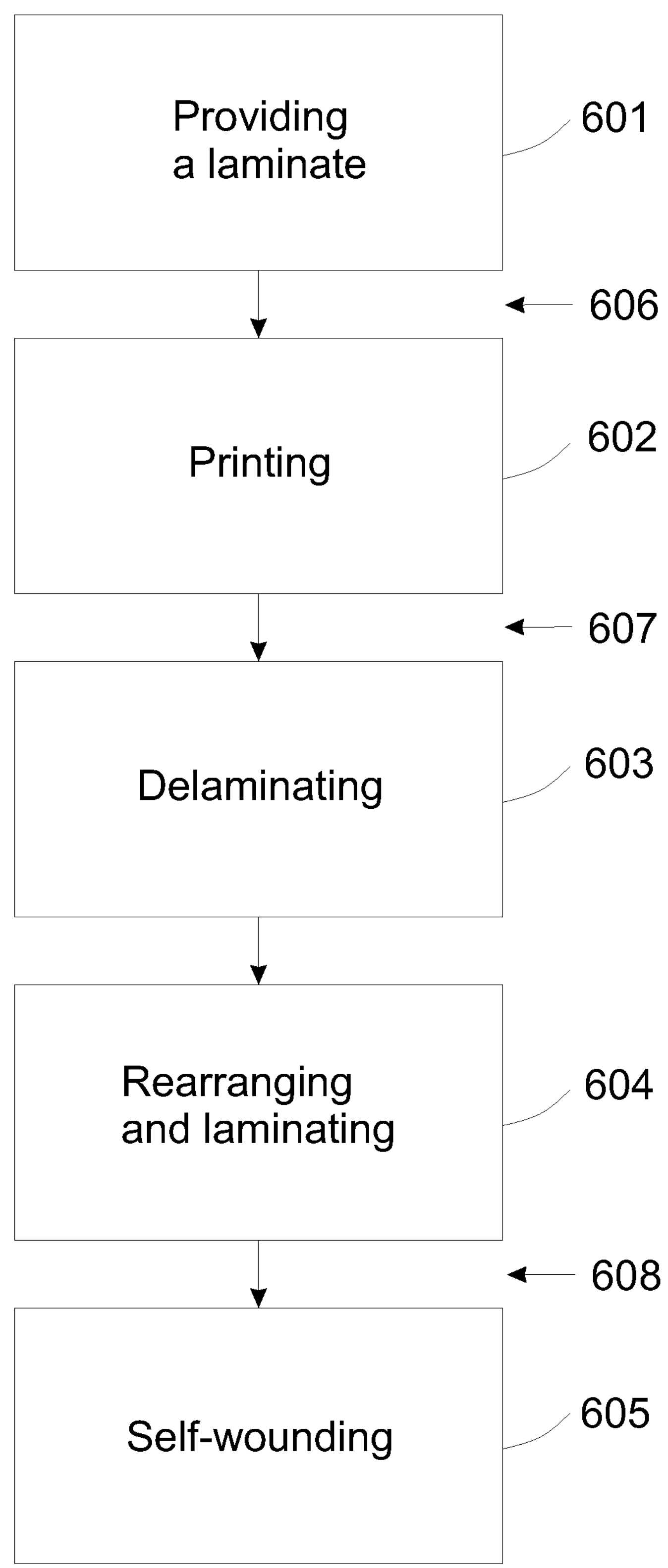
FIG. 6 illustrates a flow chart of a method according to one embodiment

A general principle of the method for preparing a label from the laminate is presented in FIG. 6 as a flow chart. First a laminate web having a printable surface is provided 601. This may include preparing the laminate using any suitable method. The laminate may be provided as wound into a roll for storage and/or transport. In one embodiment the printable surface of the laminate is printed 602 to form a printed laminate. The printed laminate may again be wound into a roll for storage and/or transport. In a subsequent step the printed laminate is delaminated 603 to separate from each other a first integral layer unit 107 from a second integral layer unit 108 of the laminate. In an alternative embodiment the printing is carried out after the delamination step (not shown in FIG. 6). A laminating adhesive layer 105 is applied onto the first integral unit or onto the second integral unit. The integral layer units are then rearranged and relaminated 604 into a different order so that the second integral layer unit 108 overlays the first integral layer unit 107 to form a printed label wherein a pressure sensitive adhesive is at the bottom and the release layer is on top of the label. This label web may be wound into a roll to form a self-wound label web 605. The label web may be die-cut to form a plurality of predefined shapes for the printed label web. There are several stages wherein the die-cutting of the laminate or the label web may be carried out. In one embodiment the die-cutting is carried out at stage 606 after the laminate has been provided 601 but before the printing 602. In one embodiment the die-cutting is carried out at stage 607 after the printing 602 but before the delaminating 603. In one embodiment the die-cutting is carried out at stage 608 after the rearranging 604.

In one embodiment the printing, separating, rearranging, laminating and die-cutting are all carried out in one pass. Practically this means that they are all carried out in the same device or device arrangement, such as in a printing press, which includes means for carrying out all said steps. In one example also the bridges are weakened in the same pass, or device. When said steps are carried out in a single device setup, time and space is saved as there is no need to transfer an intermediate product to another machine or to another premises. A final product is obtained immediately which may be wound into a roll, preferably in the same device, and transfer and deliver for use. In one embodiment the second adhesive used in this method is non-activatable, such as polyurethane adhesive or UV-acrylic adhesive.

In one specific embodiment the method comprises

- providing a multi-layered laminate 100 comprising a first integral unit 107 comprising a first layer 101 and a first adhesive layer 102 comprising a pressure sensitive adhesive, and a second integral unit 108 comprising a release layer comprising a release agent 103 and a second layer 104,
- printing on a printable surface of the laminate,
- separating the first integral unit 107 from the second integral unit 108;
- rearranging the second integral unit 108 on top of the first integral unit 107, with the release layer comprising a release agent 103 on top of the label 110;
- laminating the first integral unit 107 and the second integral unit 108 together with a second adhesive layer 105 to obtain a linerless face laminate web.

In one embodiment the printable surface of the laminate is on the first layer 101 of the first integral unit 107. In one embodiment the printable surface of the laminate is on the second layer 104 of the second integral unit 108.

In one example a next step, which may be carried out also separately for example in a separate premise to wherein the face laminate has been transferred, comprises

- die-cutting the construction through all the layers to form a predefined shape 701 for the face laminate, and
- defining a bridge 703 between individual shapes 701 to form a face laminate web having plurality of individual shapes attached to each other.

This continuous label web having plurality of individual shapes attached to each other may be wound onto a roll for storage and/or transportation after the cut waste material has been removed. One embodiment provides the face laminate described herein as a continuous label web having plurality of individual shapes attached to each other by a bridge. In one embodiment the bridge is not-weakened. In one embodiment the bridge is weakened.

According to an embodiment a surface treatment is made to a printable surface of a label, face laminate or a laminate. The surface receiving a print may be treated. Surface treatment may comprise corona, flame or plasma treatment, for example. Surface treatment causes increase in a surface energy of the treated surface. Surface treatment with high voltage discharge modifies only the surface without affecting internal properties of the treated material. Surface energy has effect on how well a liquid, like ink, wets the surface. Surface energy has effect on printability of a surface. Example surface energy values for some materials are approximately less than 20 mN/m for silicone and polytetrafluoroethylene (PTFE), 30 mN/m for polypropylene (PP), 32 mN/m for polyethylene (PE) or cross linked polyethylene (XLPE), 34 mN/m for polystyrene (PS), polycarbonate (PC), acrylonitrile butadiene styrene (ABS) and polyurethane (PUR). Surface energy of a treated surface may be at least 38 mN/m. Example ranges for a surface energy of a printable surface for adhesion with UV ink are 44-56 mN/m for UV ink, 50-56 mN/m for water based ink, 46-52 mN/m for coatings, 48-56 mN/m for water based glue, 44-59 mN/m for UV glue. A surface treatment causes temporal changes to the treated surface. A treated surface shall interface with coating, ink, adhesive or another material after the treatment, preferably before any storage or transportation. Effect(s) of the surface treatment may decrease over time. While time passes after the surface treatment, the effects of the treatment gradually decrease till those become void. Once the treated surface has been interfaced with coating, ink, adhesive or another material, the bond becomes permanent.

In some examples the printable surface is not fully printed. According to embodiments a surface may comprise print on 10-70% of its surface area; or on 3-10% of its surface area. Rest of the area may comprise transparent area, or for example polyester labels may comprise white area in addition to the printed area. In some examples the printable surface is fully printed or substantially fully printed, such as 70-100% printed, or 90-100% printed or 99-100% printed. For examples if the label is white, such as for use on PET containers, it may be fully printed.

According to embodiments the label structure maintains its construction without layer separation in use and washing conditions. The adhesive force arranged to laminate layers of a label together withstands washing conditions. The washed label comprises label construction after the wash-off process. No residues of ink or adhesive is released to the washing liquid.

Figure 2:
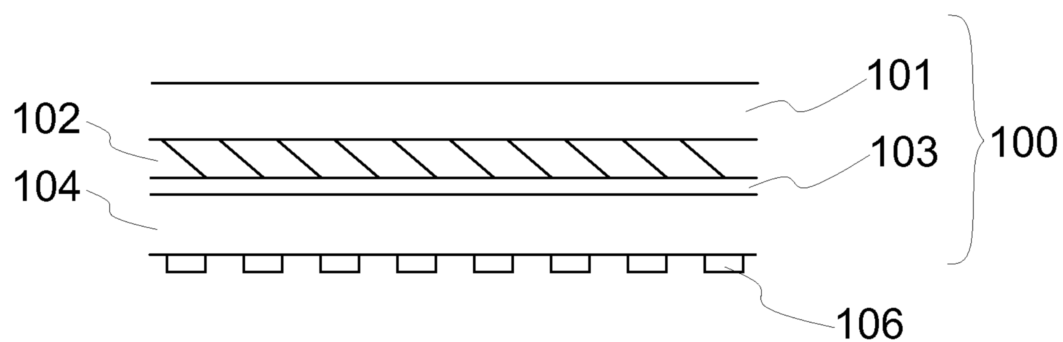
FIG. 2 illustrates a cross-sectional view of the structure of a printed laminate wherein the second layer is printed
Figure 3:
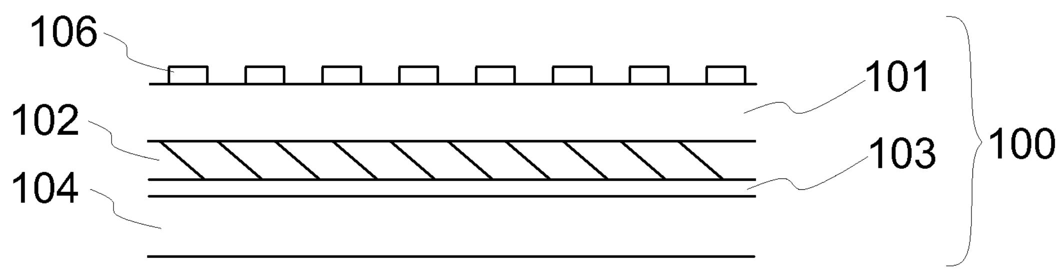
FIG. 3 illustrates a cross-sectional view of the structure of a printed laminate wherein the first layer is printed

FIG. 2 illustrates a laminate according to an example, wherein a print layer 106 is provided on a second side of a printable second layer 104. FIG. 3 illustrates a laminate according to an example, wherein a print layer 106 is provided on a first side of a printable first layer 101. The print layer 106 may comprise printed information in any form, like letters, numbers, images or codes. Used printing method may be flexographic, screen printing, offset, letter press, thermal transfer, or any other suitable printing method compatible with used label. The print layer 106 comprises ink. The inks used may comprise water-based, solvent-based or radiation-curable inks. Ink primers or ink adhesion promoter may be applied to a surface before application of the ink. A printable surface may be coated or surface treated in order to improve adhesion of the ink to a layer. This has positive effect on printability and print quality. In an embodiment, a print layer 106 is a polymeric ink layer. For example a cross-linked ink may be screen printed onto a printable layer of a label. The print layer 106 may be provided on a top coat, which comprises good printing properties. Choice of printing technique and/or inks used depends on printable layer, among others. Print layer may comprise character(s), symbol(s) or graphics, applied in mono- or multicolours.

When preparing the label said laminate is delaminated, rearranged and relaminated to form the face laminate. In one embodiment the second adhesive, or laminating adhesive, is applied during the process. In one embodiment a laminating adhesive is applied to the construct as a second adhesive layer 105 during the process before relaminating. The laminating adhesive may be applied using any suitable method, such as a curtain coating or a reverse gravure method or any other roller-coating method. If the laminating adhesive is applied onto a printable surface, the surface must be already printed before applying the laminating adhesive.

In one embodiment the second adhesive layer is applied before delaminating or separating the laminate. In one embodiment the second adhesive layer is applied after delaminating or separating the laminate. The second adhesive layer 105 may comprise for example UV curable adhesive, such as UV-curable acrylic adhesive, laminating adhesive, polyurethane adhesive, such as PUR adhesive, solvent-based polyurethane, solventless polyurethane or moisture-curing polyurethane. In one embodiment the second adhesive layer contains activatable adhesive. In one embodiment the second adhesive layer contains no activatable adhesive, such as heat-activated adhesive. However, the adhesive may be cured by heat or radiation. The second adhesive layer 105 may have a thickness in the range of about 1-20 μm, for example in the range of about 2-10 μm, such as 2-5 μm. The second adhesive layer should tolerate the washing conditions to avoid contaminating or disrupting the washing process. The second adhesive may be selected in such way that the adhesion of the second adhesive does not substantially decrease at washing conditions, which generally comprise increased temperature and alkaline conditions. The first and second layer attached with the second adhesive will not be separated during the washing process so the print between the layers remains sealed and does not wash out to contaminate the washing solution.

In one embodiment a second adhesive layer 105 is applied to the second layer 104. In that case the second side of the second layer 104 faces the second adhesive layer 105. In one embodiment the second layer is printed before applying the adhesive. In that case the print layer 106 on the second side of the second layer 104 faces the second adhesive layer 105.

In one embodiment a second adhesive layer 105 is applied to the first layer 101. In that case the first side of the first layer 101 faces the second adhesive layer 105. In one embodiment the first layer 101 is printed before applying the adhesive. In that case the print layer 106 on the first side of the first layer 101 faces the second adhesive layer 105.

In one specific embodiment the second adhesive layer 105 is applied onto the second layer 104 before delaminating or separating the laminate. In one specific embodiment the second adhesive layer 105 is applied onto the first layer 101 before delaminating or separating the laminate. In one embodiment the laminate 100 is provided with the second adhesive layer 105 already applied onto the second layer.

Next the method for manufacturing the face laminate comprises separating the first layer 101, and the first adhesive layer 102 comprising a pressure sensitive adhesive, from the release layer 103 and the second layer 104. The first layer 101 and the first adhesive layer 102 comprising a pressure sensitive adhesive form a first integral unit 107. The release layer 103 and the second film layer 104 form a second integral unit 108. These integral units are transferrable and detachable from each other. Said integral units may also be called integral layer units.

In one specific embodiment the second adhesive layer 105 is applied onto the second layer 104 after delaminating or separating the laminate. In one specific embodiment the second adhesive layer 105 is applied onto the first layer 101 after delaminating or separating the laminate.

The first integral unit 107 overlies the second integral unit 108 in the laminate structure 100. The release layer 103 enables the smooth separation of the first integral unit 107 and the second integral unit 108 from each other. Said separating may also be called delaminating. FIG. **4*a* illustrates a cross-sectional view the structure of a printed laminate wherein the first integral unit 107 and the second integral unit 108 are separated and wherein a second adhesive layer 105 has been applied onto the printed second side of the second film layer 104 having a print layer 106**.

FIG. **5*a* illustrates a cross-sectional view the structure of a printed laminate wherein the first integral unit 107 and the second integral unit 108 are separated and wherein a second adhesive layer 105 has been applied onto the printed first side of the first film layer 101 having a print layer 106**.

Next the layers are rearranged by applying the release layer and the second layer 104 on top of the printed first layer 101, and the first adhesive layer 102 comprising a pressure sensitive adhesive, to form the printed label. This step may also be called laminating. The second adhesive layer 105 applied previously will adhere the layers together i.e. the integral units are adhesively joined. The face laminate obtained will have a different order of the original layers from the laminate, but the same direction of the layers, i.e. neither of the integral units are turned upside down.

In an embodiment this separation and rearrangement (delamination and lamination) is carried out with an apparatus for preparing a face laminate, said apparatus comprising means, such as a roll, arranged to unwind the wound laminate web comprising the multi-layered laminate as described herein; delaminating or separating means or unit arranged to delaminate the first integral unit 107 from the second integral unit 108; laminating means comprising means for applying a second adhesive to laminate the first integral unit 107 and the second integral unit 108 together and means or unit for rearranging the second integral unit 108 on top of the first integral unit 107, with the release layer comprising a release agent on top of the face laminate, to prepare the face laminate 110. The apparatus may be arranged to carry out any of the methods described herein. The laminating means generally contain means for rearranging the layers. In one embodiment the laminating means also contain means for applying the second adhesive layer to laminate the second layer and the first layer together. The laminating means herein may also be called relaminating means.

In one embodiment the means for applying a second adhesive layer 105 are arranged to apply the second adhesive layer onto the second layer 104, usually before the means for rearranging. In one embodiment the means for applying a second adhesive layer 105 are arranged to apply the second adhesive layer onto the first layer 101, usually before the means for rearranging.

In an embodiment the apparatus comprises a printer unit or means for printing arranged to print on the first layer of the first integral unit 107 before the die-cutting means, to form a printed face laminate 110. In an embodiment the apparatus comprises a printer unit or means for printing arranged to print on the first layer of the first integral unit 107 after the die-cutting means, to form a printed face laminate 110. In an embodiment the apparatus comprises a printer unit or means for printing arranged to print on the second layer of the second integral unit 108 before the die-cutting means, to form a printed face laminate 110. In an embodiment the apparatus comprises a printer unit or means for printing arranged to print on the second layer of the second integral unit 108 after the die-cutting means, to form a printed face laminate 110.

Figure 12:
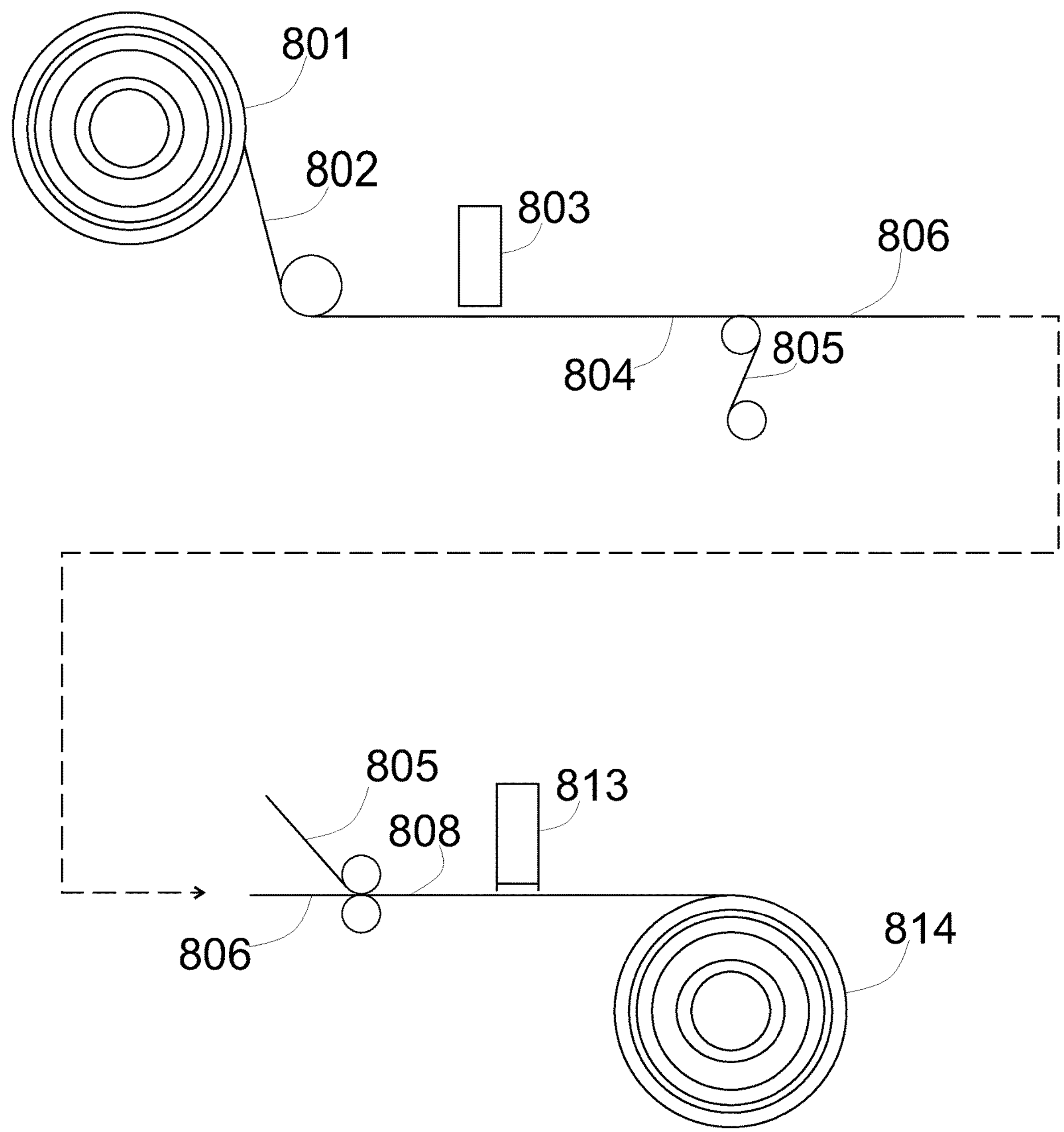
FIG. 12 illustrates an apparatus for manufacturing the label web

FIG. 12 illustrates an exemplary setup of apparatuses which may be used during the process of preparing the face laminate.

Figure 4A:
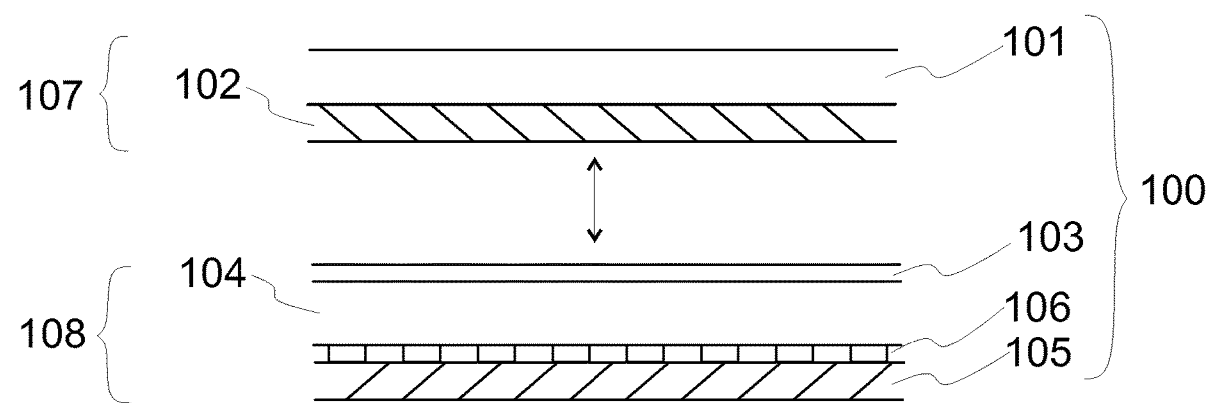
FIG. 4 illustrates (a) a cross-sectional view of the structure of a printed laminate wherein the first integral unit and the second integral unit are separated and the second adhesive layer is applied onto the printed second layer, and (b) wherein the first and the second integral units have been subsequently rearranged and relaminated
Figure 4B:
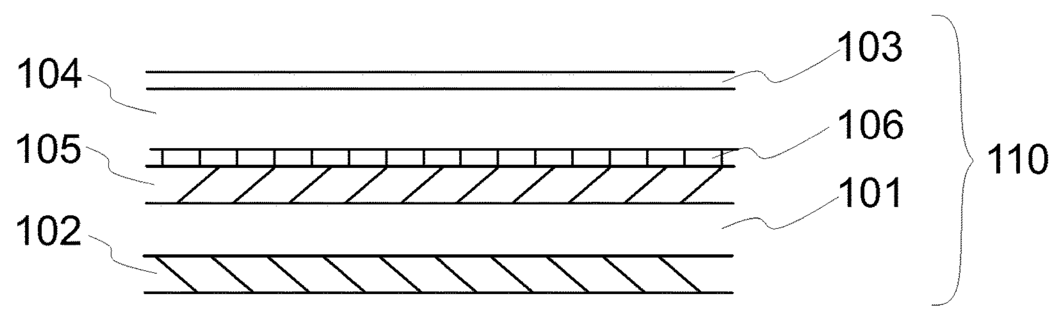

As illustrated in FIG. 4*b* in one embodiment the face laminate 110 comprises the following layers in the following order: a release layer 103 comprising a release agent, a second layer 104, a print layer 106, a second adhesive layer 105, a first layer 101, and a first adhesive layer 102 comprising a pressure sensitive adhesive. In one embodiment the face laminate consists of said layers.

Figure 5A:
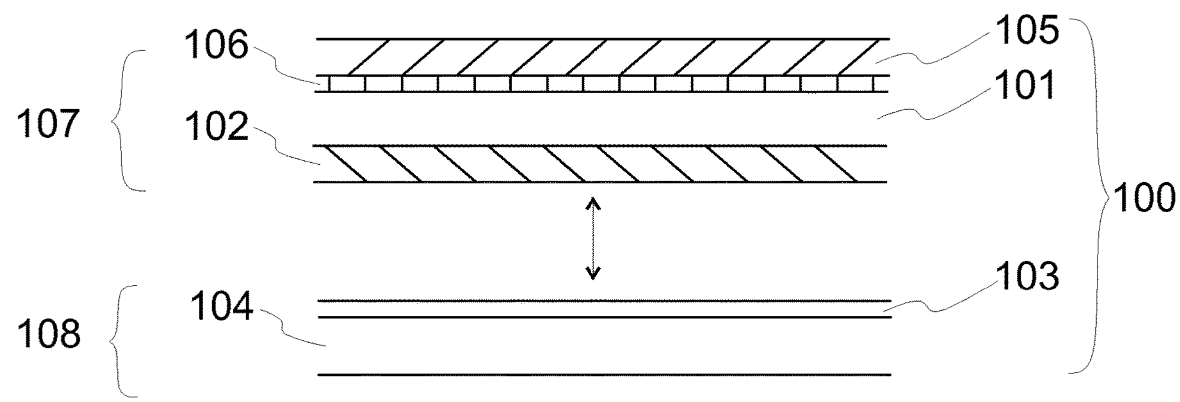
FIG. 5 illustrates (a) a cross-sectional view of the structure of a printed laminate wherein the first integral unit and the second integral unit are separated and the second adhesive layer is applied onto the printed first layer, and (b) wherein the first and the second integral units have been subsequently rearranged and relaminated
Figure 5B:
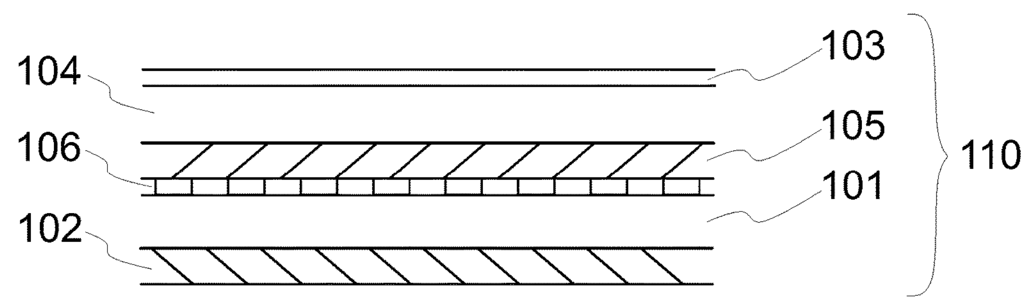

As illustrated in FIG. 5*b* in one embodiment the face laminate 110 comprises the following layers in the following order: a release layer 103 comprising a release agent, a second layer 104, a second adhesive layer 105, a print layer 106, a first layer 101, and a first adhesive layer 102 comprising a pressure sensitive adhesive. In one embodiment the face laminate consists of said layers.

The printed surface is now protected by the originally second layer 104, which generally is transparent to allow the visibility of the print layer 106. On top of the second layer there is also a protecting release coating layer 103, which may be for example silicone layer. This glide layer may also help the handling of the label in the equipment. The topmost layer(s) of the label may protect the print and/or has effect on appearance of the label and/or has effect on label's durability on external influences, like wear, humidity, sunlight, UV-radiation, cold and so on.

The pressure sensitive adhesive is now at the bottom of the label. The release layer wound next to the pressure sensitive adhesive layer in a roll enables the label web to be releasably wound on itself. The second side of the pressure sensitive adhesive will be adhesively joined to the outer surface of the item, which may be any suitable container, such as a bottle or the like. Examples of such bottles and containers include beverage bottles, bottles containing hygienic or cosmetic products, bottles containing chemicals and the like. The material of the container may be marked as recyclable. In one example the bottle is a recyclable bottle. In one embodiment the container is made of glass. In one embodiment the container is made of plastics.

It may be advantageous that the label is stiff. For example, the first and/or the second layers of a label comprise stiff material. Stiff or substantially stiff material refers to stiffness of material, or a rigid material, enabling manufacturing and processing of the label at certain speed with the required exactness. Especially printing is enabled. In order to sustain handling, transportation and labelling, a label or at least some of its layers are desired to have certain stiffness in the machine direction (MD) and in the cross direction (CD). Since the label changes its shape during wash off, stiffness is required for both first and the second layer according to embodiments. The label advantageously has stiff construction and high modulus. The laminating adhesive layer 105 between the laminate label layers may provide stiffness to the construction. The laminating adhesive 105 may be rigid and hard. While providing rigidity to the structure, the laminating adhesive 105 flexibly passes tension forces induced at the wash conditions from a label layer to another.

Tensile modulus may be used to describe the stiffness of the material. It may be defined according to the standard ASTM D882. In polymers and products comprising polymers, such as label laminates or layers of such, the tensile modulus may be directional, where the tensile modulus in a first direction may differ from the tensile modulus in a second direction. The tensile modulus may be referred to as the ratio of stress to elastic strain in tension. A high tensile modulus corresponds with rigid material. In other words more stress is required to produce a given amount of strain. In one embodiment the tensile modulus is measured in cross direction. In one embodiment the tensile modulus is measured in machine direction. For example, the MD or CD tensile modulus may be in the range of 0.8-8.0 GPa. For example for PET the tensile modulus may be in the range of 7.0-8.0 GPa. The tensile modulus may differ according to orientation ratio in machine direction (MD) and cross direction (CD). If both films contain the same material, the tensile modulus in MD is usually greater than in CD. In cases of TD-stretched films or in tenter-frame BOPP films the tensile modulus in CD is usually greater than in MD. The tensile modulus ratio MD/CD of MD oriented multilayer film may be in the range of 2.1-3.8 based on ISO 527 standard for plastic films.

In one embodiment the face laminate has a stiffness of at least 1 mN/m (measured using Lorentzen & Wettre (L&W) method), preferably at least 3 mN/m.

The surface suitable for printing should have a sufficiently high surface tension. A low surface tension may lead to poor retaining capability of printing ink applied to the surface. For example, the plastic film may have a surface tension at least 36 dynes/cm, preferably at least 38 dynes/cm or at least 44 dynes/cm measured according to the standard ASTM D-2578. The surface tension may be between 36 and 60 dynes/cm, preferably between 38 and 56 dynes/cm or between 44 and 50 dynes/cm. The surface tension level may also be maintained higher than or equal to 38 dynes/cm after 50 or 120 days.

Graphical patterns may be printed on the printable surface of the label. The graphical patterns may be manufactured by conventional printing methods, such as gravure, flexographic letterpress, off-set, screen, electrophotography, digital, thermal transfer, or ink jet printing processes. In order to provide high printing speeds, thin and controllable ink thickness or good colour coverage, flexographic printing is preferred. It is typical for wash-off beverage labels, in particular for beer bottles, to also use gravure inks. Flexographic inks may be solvent-based, water-based, or radiation curable. For example, UV curable inks may be used for flexographic printing as well as in ink-jet printers. The flexographic printing may be used in the packaging industry for the printing of flexible packages, such as plastic wrappings, corrugated board as well as adhesive label laminates. Optionally, other inks may be used, for example inks suitable for gravure, offset, electrophotography, digital, letterpress printing, screen printing, thermal transfer printing, or ink jet printing. Also metallic inks may be used. Dynamic viscosity of inks for gravure printing may be, for example, 0.05 to 0.2 Pascal seconds and 0.05 to 0.5 Pascal seconds for flexographic printing inks.

Flexographic printing is a mechanical letterpress method which is characterized by a soft and flexible printing plate. At the printing stage, the material to be printed is conveyed between the flexible printing plate and a hard backing roll, wherein printing ink is transferred by pressing to a desired location in the material to be printed. In multicolour printing, the ink layer needs to be dried (cured) after every printing unit. For example, UV curable inks may be used. UV curable printing inks are printing inks whose curing is not based on the evaporation of a solvent substance as in conventional printing inks but on a polymerization reaction by means of UV radiation and oxygen. According to their name, UV printing inks are cured by ultraviolet radiation whose wavelength is typically 180 to 380 nm. Advantages of using UV curable printing inks include the lack of a solvent, which makes it possible to reduce effluents compared with solvent-based printing inks. Also, the curing rate, formability, good resistance to chemicals and scratching, and colour saturation are examples of the advantages of the ink. With UV printing inks, the thickness of the printing ink layer is typically 0.8 to 2.5 μm, while it is about 0.8 to 1 μm for solvent-based inks. Because no mass is evaporated from UV inks after printing, it is easier to adjust the layer thickness. Because no evaporation takes place, the inks are not spread, wherein the print quality is better. Compared with conventional printing inks, radiation curable printing inks also have the advantage of a very high curing rate. The printing surfaces of UV inks are strong and glossy, which makes them a very good alternative for the printing of products susceptible to wear, such as labels.

The main components of the printing inks in mechanical printing are pigment, binder and solvent. In UV printing inks, the binder used consists of oligomers, which are often epoxy, polyester, urethane or acrylate based. Even if there are no actual solvents, functional monomers can be regarded as such in UV printing inks. The most important additive is the photoinitiator which enables the polymerization reaction. UV ink may comprise, for example, between 50 and 70% of a binder, between 10 and 30% of functional monomers, between 20 and 25% of pigment, and between 5 and 10% of additives, such as photoinitiators. Photoinitiators are compounds which contain reactive groups and react to high-energy radiation by starting the polymerization reaction. The energy of UV radiation as such is not sufficient for starting the polymerization reaction, so that the photoinitiators are a very important component in UV printing inks. The most typical photoinitiators which form free radicals contain benzophenols, acetophenols, tertiary or acrylic amines, or their derivatives. For example, 2-isopropylthioxanthone (ITX) may be used as a photoinitiator. By the energy of UV radiation, the photoinitiators of the printing ink react by producing free radicals. As a result of the reaction, the monomers and oligomers in the printing ink are combined and cross-linked to each other, forming polymer chains and simultaneously curing the printing ink to a solid film. This reaction is very fast, because it takes no longer than a few seconds, normally in some hundredth parts of seconds. The photoinitiator may start the curing reaction either by breaking into free radicals, or ions.

Solvent based inks may comprise, for example, toluene, alcohols, ketones, esters or glycols as a solvent. Water based inks may comprise water and alkali, alcohols and glycols as a solvent. The content of solvent may be e.g. 40 to 70%. In addition, said inks may comprise 10 to 30% of a binder, for example hydrocarbon resins and derivatives, polyamide, nitrocellulose, acrylic or styrene based polymers. The content of organic or inorganic pigments may be 5 to 40%. Further, a minor content of additives and/or may be included.

Conventionally, an additional layer may be provided on top of the printing layer 106 of the laminate. The additional layer is typically a transparent protective layer, such as a lacquer or a laminated film layer. Also other kind of layers are suitable and may be used alternatively or additionally. The topmost layer of the label may protect the print 106 and/or has effect on appearance of the laminate and/or has effect on laminate's durability on external influences, like wear, humidity, sunlight, UV-radiation, cold and so on. Attaching an additional layer on top of a printed surface of a laminate web requires an extra coating or laminating step after printing. It is typical that a labelstock provider or manufacturer transmits a laminate or label web to a printing press of a printer or converter, where printing is applied on a surface of the web. The printed laminate or label web is then wound into a roll for transferring. The roll of printed web is transmitted to a printer, where an additional layer is laminated on top of the printed layer. In addition to the extra process step of over-coating, the laminate or label stock is transferred back and forth, wound (or rolled) for transferring, and handled and/or treated in separate locations by different providers. Additional layer is needed, as well as an equipment for laminating or attaching it. This is time consuming and induces costs.

At least some/all embodiments of the present invention have effect of avoiding need of a separate step of providing a layer on top of a print layer. According to embodiments no extra over-coating at label provider's premises is required. The multi-layered laminate already contains the second layer, which acts both as the liner and as the over-coating layer.

In an example the delaminated second integral unit may be transferred through series of rollers and guided so that it is attachable onto the print layer 106, or on the printed surface 106 of the first film layer 101, or the face stock. The integral units are not turned but only the order of the first and the second integral unit is switched.

The face laminate 110 as illustrated in FIG. 4*b* or 5*b* may be self-wound to a roll. The face laminate web is wound (rolled) in order to be storable and/or transferrable. The linerless printed label web may be transferred to a site, where the label web is stored and/or separate labels are formed and/or labels are attached on articles. When wound to a roll, the release layer 103 is arranged to act as a release layer for the adhesive layer 102. The pressure sensitive adhesive layer 102 and the release layer 103 are next to each other, when the linerless label web according to FIG. 4*b* or 5*b* is wound on itself. Embodiments have effect of providing a linerless, self-adhesive label web, which is woundable onto itself.

One embodiment provides a labelled item having said face laminate attached to a surface of said item. The second side of the pressure sensitive adhesive is adhesively joined to the outer surface of the item. The face laminate is removable from the item in a washing conditions.

Different label constructions may be used for labelling different types of items for different purposes and different types of washes. In one embodiment the second layer 104 comprises shrinkable monoaxially oriented polyolefin film and the first layer 101 comprises polyolefin film. The polyolefin may be for example polyethylene or polypropylene. In one embodiment the second layer 104 comprises shrinkable monoaxially oriented polyethylene film and the first layer 101 comprises polyethylene film. In one embodiment the second layer 104 comprises shrinkable monoaxially oriented polyethylene film and the first layer 101 comprises polypropylene film. In one embodiment the second layer 104 comprises shrinkable monoaxially oriented polypropylene film and the first layer 101 comprises polyethylene film. In one embodiment the second layer 104 comprises shrinkable monoaxially oriented polypropylene film and the first layer 101 comprises polypropylene film.

In one embodiment the printed face laminate comprises multiple layers in the following order:

- a release layer comprising a release agent,
- a film layer comprising an oriented polyolefin film,
- a second adhesive layer,
- a film layer comprising an oriented polyolefin film, and
- a first adhesive layer comprising a pressure sensitive adhesive. Such a face laminate is suitable for example for PET bottles, especially if the total average density of the face laminate is less than 1.0 g/cm$^3$.

In one embodiment the printed face laminate comprises multiple layers in the following order:

- a release layer comprising a release agent,
- a film layer comprising an oriented polyolefin film,
- a second adhesive layer,
- a film layer comprising an oriented polyester film, and
- a first adhesive layer comprising a pressure sensitive adhesive.

In one embodiment the printed face laminate comprises multiple layers in the following order:

- a release layer comprising a release agent,
- a film layer comprising an oriented polyester film,
- a second adhesive layer,
- a film layer comprising an oriented polyester film, and
- a first adhesive layer comprising a pressure sensitive adhesive. Such a face laminate is suitable for example for glass bottles, especially if the total average density of the face laminate is at least 1.0 g/cm$^3$.

In these embodiments the first film layer may comprise non-annealed film, the second film layer may comprise non-annealed film or both the first and the second film layers comprise non-annealed films. Said non-annealed films may be shrinkable. Non-annealed shrinkable films are suitable for labels for example for PET or glass items. The orientation may be any combination described herein, for example wherein the first film layer comprises a non-annealed cross direction oriented film and the second film layer comprises a non-annealed machine direction oriented film, or wherein the first film layer comprises a non-annealed machine direction oriented film and the second film layer comprises a non-annealed cross direction oriented film.

The first film may have a thickness in the range of about 10-60 μm, for example in the range of about 10-40 μm, or 10-30 μm. The second film may have a thickness in the range of about 10-60 μm, for example in the range of about 10-40 μm, or 10-30 μm. The thickness of the face laminate having the first film, the first adhesive layer and the second film together may be in the range of 20-100 μm, for example in the range of 25-80 μm, for example 30-50 μm, or even 30-60 μm. The haze of the face laminate may be less than 10%, preferably less than 5% with clear or transparent adhesives. Preferably the polyester is PET. Preferably the polyolefin is polyethylene or polypropylene, or a mixture thereof or another polyolefin.

One example of the labelled item is a labelled PET item comprising a printed face laminate 110 attached to a surface of the item, the face laminate comprising multiple layers in the following order: a release layer 103 comprising a release agent, a film layer comprising a polyolefin film 104, a second adhesive layer 105, a print layer 106, a film layer comprising a polyolefin film and having a printable surface 101, and an adhesive layer comprising a pressure sensitive adhesive 102.

One example of the labelled item is a labelled PET item comprising a printed face laminate 110 attached to a surface of the item, the face laminate comprising multiple layers in the following order: a release layer 103 comprising a release agent, a film layer comprising a polyolefin film 104, a print layer 106, a second adhesive layer 105, a film layer comprising a polyolefin film, 101, and an adhesive layer comprising a pressure sensitive adhesive 102.

In one embodiment the second layer 104 comprises a polyester film and the first layer 101 comprises a shrinkable monoaxially oriented polypropylene film. In one embodiment the second layer 104 comprises a shrinkable monoaxially oriented polyester film and the first layer 101 comprises a shrinkable monoaxially oriented polypropylene film.

One example of the labelled item is a labelled glass item comprising a printed face laminate 110 attached to a surface of the item, the face laminate comprising multiple layers in the following order: a release layer 103 comprising a release agent, a film layer comprising a monoaxially oriented polyester film 104, a second adhesive layer 105, a print layer 106, a film layer comprising polypropylene 101, and a first adhesive layer comprising a pressure sensitive adhesive 102. The glass item may be washed to release the face laminate.

One example of the labelled item is a labelled glass item comprising a printed face laminate 110 attached to a surface of the item, the face laminate comprising multiple layers in the following order: a release layer 103 comprising a release agent, a film layer comprising a monoaxially oriented polyester film 104, a print layer 106, a second adhesive layer 105, a film layer comprising polypropylene 101, and a first adhesive layer comprising a pressure sensitive adhesive 102.

One example of the labelled item is a labelled polyolefin item comprising a printed face laminate attached to a surface of the item, the face laminate comprising multiple layers in the following order: a release layer 103 comprising a release agent, a film layer comprising a non-shrinkable monoaxially oriented polypropylene film 104, a second adhesive layer 105, a print layer 106, a film layer comprising polypropylene 101, and a first adhesive layer comprising a pressure sensitive adhesive 102. The polyolefin may be for example selected from high density polyethylene and polypropylene.

One example of the labelled item is a labelled polyolefin item comprising a printed face laminate attached to a surface of the item, the face laminate comprising multiple layers in the following order: a release layer 103 comprising a release agent, a film layer comprising a non-shrinkable monoaxially oriented polypropylene film 104, a print layer 106, a second adhesive layer 105, a film layer comprising polypropylene 101, and a first adhesive layer comprising a pressure sensitive adhesive 102. The polyolefin may be for example selected from high density polyethylene and polypropylene.

Different combinations of polymers or derivatives thereof disclosed herein may be applied to the compositions of the first layer and the second layer. The following examples include the polymers as such and the derivatives thereof. In one example the first layer comprises polyethylene and the second layer comprises polyethylene. In one example the first layer comprises polyethylene and the second layer comprises polypropylene. In one example the first layer comprises polyethylene and the second layer comprises polyethylene terephthalate. In one example the first layer comprises polyethylene and the second layer comprises PVC. In one example the first layer comprises polyethylene and the second layer comprises polyester. In one example the first layer comprises polyethylene and the second layer comprises polystyrene. In one example the first layer comprises polyethylene and the second layer comprises polylactic acid. In one example the first layer comprises polyethylene and the second layer comprises cyclic olefin (co) polymer.

In one example the first layer comprises polypropylene and the second layer comprises polyethylene. In one example the first layer comprises polypropylene and the second layer comprises polypropylene. In one example the first layer comprises polypropylene and the second layer comprises polyethylene terephthalate. In one example the first layer comprises polypropylene and the second layer comprises PVC. In one example the first layer comprises polypropylene and the second layer comprises polyester. In one example the first layer comprises polypropylene and the second layer comprises polystyrene. In one example the first layer comprises polypropylene and the second layer comprises polylactic acid. In one example the first layer comprises polypropylene and the second layer comprises cyclic olefin (co)polymer.

In one example the first layer comprises polyethylene terephthalate and the second layer comprises polyethylene. In one example the first layer comprises polyethylene terephthalate and the second layer comprises polypropylene. In one example the first layer comprises polyethylene terephthalate and the second layer comprises polyethylene terephthalate. In one example the first layer comprises polypropylene and the second layer comprises PVC. In one example the first layer comprises polyethylene terephthalate and the second layer comprises polyester. In one example the first layer comprises polyethylene terephthalate and the second layer comprises polystyrene. In one example the first layer comprises polyethylene terephthalate and the second layer comprises polylactic acid. In one example the first layer comprises polyethylene terephthalate and the second layer comprises cyclic olefin (co)polymer.

In one example the first layer comprises PVC and the second layer comprises polyethylene. In one example the first layer comprises PVC and the second layer comprises polypropylene. In one example the first layer comprises PVC and the second layer comprises polyethylene terephthalate. In one example the first layer comprises PVC and the second layer comprises PVC. In one example the first layer comprises PVC and the second layer comprises polyester. In one example the first layer comprises PVC and the second layer comprises polystyrene. In one example the first layer comprises PVC and the second layer comprises polylactic acid. In one example the first layer comprises PVC and the second layer comprises cyclic olefin (co)polymer.

In one example the first layer comprises polyester and the second layer comprises polyethylene. In one example the first layer comprises polyester and the second layer comprises polypropylene. In one example the first layer comprises polyester and the second layer comprises polyethylene terephthalate. In one example the first layer comprises polyester and the second layer comprises PVC. In one example the first layer comprises polyester and the second layer comprises polyester. In one example the first layer comprises polyester and the second layer comprises polystyrene. In one example the first layer comprises polyester and the second layer comprises polylactic acid. In one example the first layer comprises polyester and the second layer comprises cyclic olefin (co)polymer.

In one example the first layer comprises polystyrene and the second layer comprises polyethylene. In one example the first layer comprises polystyrene and the second layer comprises polypropylene. In one example the first layer comprises polystyrene and the second layer comprises polyethylene terephthalate. In one example the first layer comprises polystyrene and the second layer comprises PVC. In one example the first layer comprises polystyrene and the second layer comprises polyester. In one example the first layer comprises polystyrene and the second layer comprises polystyrene. In one example the first layer comprises polystyrene and the second layer comprises polylactic acid. In one example the first layer comprises polystyrene and the second layer comprises cyclic olefin (co)polymer.

In one example the first layer comprises polylactic acid and the second layer comprises polyethylene. In one example the first layer comprises polylactic acid and the second layer comprises polypropylene. In one example the first layer comprises polylactic acid and the second layer comprises polyethylene terephthalate. In one example the first layer comprises polylactic acid and the second layer comprises PVC. In one example the first layer comprises polylactic acid and the second layer comprises polyester. In one example the first layer comprises polylactic acid and the second layer comprises polystyrene. In one example the first layer comprises polylactic acid and the second layer comprises polylactic acid. In one example the first layer comprises polylactic acid and the second layer comprises cyclic olefin (co)polymer.

In one example the first layer comprises cyclic olefin (co)polymer and the second layer comprises polyethylene. In one example the first layer comprises cyclic olefin (co) polymer and the second layer comprises polypropylene. In one example the first layer comprises cyclic olefin (co) polymer and the second layer comprises polyethylene terephthalate. In one example the first layer comprises cyclic olefin (co)polymer and the second layer comprises PVC. In one example the first layer comprises cyclic olefin (co) polymer and the second layer comprises polyester. In one example the first layer comprises cyclic olefin (co)polymer and the second layer comprises polystyrene. In one example the first layer comprises cyclic olefin (co)polymer and the second layer comprises polylactic acid. In one example the first layer comprises cyclic olefin (co)polymer and the second layer comprises cyclic olefin (co)polymer.

Washable Label Having Two Films Oriented in Different Directions

One approach is that the label structure comprises a heat-shrinkable plastic film layer causing the label to curl and detach the label from the surface of an item under typical washing conditions at 80-85° C. in an alkaline solution. Typically these labels comprise a release liner, for example a polyester film, coated with silicone which is then further coated with a pressure-sensitive adhesive and dried under heat in an oven. The major deficiencies of these types of constructions are that they are rather costly and in addition, in some cases they are using environmentally questionable PVC solutions. The labels, when washed off, will curl to a very small radius "pipe". These pipes will cause problems in the washing equipment.

It would be desirable to produce wash-off labels which are economical but also environmentally friendly, totally removable from a surface of an item without leaving deposits or remnants of adhesive on the surface of the item. It would be desirable if the materials could be separated and easily recovered and recycled and would not harm or block the equipment.

One embodiment provides a printed linerless face laminate as described herein, wherein the second layer comprises a second shrinkable uniaxially oriented film, and the first layer comprises a first shrinkable uniaxially oriented film, which is oriented in different direction to the second shrinkable uniaxially oriented film. In one embodiment the first layer is the first shrinkable uniaxially oriented film. In one embodiment the second layer is the second shrinkable uniaxially oriented film. In one embodiment the first layer is the first shrinkable uniaxially oriented film and the second layer is the second shrinkable uniaxially oriented film.

One embodiment provides a printed face laminate comprising the following layers in the following order:

- a second layer comprising a second shrinkable uniaxially oriented film,
- a second adhesive layer,
- a first layer comprising a first shrinkable uniaxially oriented film, which is oriented in different direction to the second shrinkable uniaxially oriented film, and
- a first adhesive layer comprising pressure sensitive adhesive. In one embodiment said printed face laminate is linerless face laminate. This embodiment may be freely combined with any of the linerless face laminates described in the present application.

One embodiment provides a washable face laminate having a printable surface and comprising the following layers in the following order:

- a second shrinkable uniaxially oriented film,
- a second adhesive layer,
- a first shrinkable uniaxially oriented film, which is oriented in different direction to the second shrinkable uniaxially oriented film, and
- a first adhesive layer comprising pressure sensitive adhesive.

One embodiment provides a laminate having a printable surface and comprising multiple layers in the following order:

- a first layer comprising a first shrinkable uniaxially oriented film,
- a first adhesive layer comprising a pressure sensitive adhesive,
- a release layer comprising a release agent, and
- a second layer comprising a second shrinkable uniaxially oriented film which is oriented in different direction to the first shrinkable uniaxially oriented film.

In the case of two shrinkable films, the films will, when heated by the washing liquid, form a shrinking force in two main shrinking directions that are in different to each other. The films may shrink in one direction and at the same time also expand in the other direction and thus will form two curling forces in an angle, for example in 90 degree angle, to each other due to the shrink/expand effect. The shrink force, as a function of temperature, would be designed so as to give a maximum effect at the washing temperature and minimal to no shrinking at lower temperatures, for example less than 5%, less than 2%, or less than 1% or about 0% at room temperature. With two shrinkable films, shrinking to different directions, especially to perpendicular directions, the label will not be rolled up into a pipe form but rather results in a relatively flat structure and will thus be less problematic for the washing process. In the wash the label will be finally attached to the container only from a single point rather than from a line and therefore it will be detached easily. Such removed labels which are not curled into a tight roll are substantially easier to remove from the machines.

It was found out that the behaviour of the laminate depends on which side of the laminate is first in contact with the heated medium, such as water. This side starts to shrink and curl first. In practice if a labelled bottle is washed, it is the top layer of the face laminate (the first film) which is first in contact with the hot liquid. The layer closest to the colder bottle (the second film) will react later. This has the effect that the properties of the top layer affect to the behaviour of the label in the wash. If the first film is a machine direction oriented film, the label starts first to curl in the vertical direction of the bottle being only attached to the bottle by a vertical line. Then the label starts to curl in the opposite direction and the attachment to the bottle further decreases being finally practically one point in the middle of the label. However, even if the two layers would have different order of the orientation, the curling effect would still provide an efficient detachment from the bottle.

The face laminate is shrinkable in the both different directions at least 5% at 80° C. forming in an elevated temperature two curling forces to said different directions which are overall higher than the adhesive force between the face laminate and a labelled item containing the face laminate attached to it.

In one embodiment said printed face laminate is linerless face laminate. The preparation process of the linerless face laminate described herein produces an end product having a release agent layer on top of the face laminate, and a pressure sensitive adhesive on the other side of the face laminate. The construction of the face laminate or the label enables winding of the self-adhesive, linerless label web onto itself. The label roll is unwound in order to cut separate labels from the label web and/or to provide self-adhesive labels to an article. According to embodiments, the layer next to the adhesive layer, when the label web is wound to a roll, is a release layer. The release layer wound next to the adhesive layer enables the label web to be releasably wound on itself. The release layer on one side of the face stock is arranged to form a release layer for the self-wound linerless label according to embodiments. The release layer also facilitates the handling of the face laminate web in the process as the reduced coefficient of friction provides smoother running.

In one embodiment the face laminate further comprises a release layer comprising a release agent attached to the adhesive layer comprising a pressure sensitive adhesive, and a liner.

An effect of the non-annealed films is that the stiffness of the film is high. Further, if one of the layers is machine direction oriented, the stiffness will further increase. During the preparation process of a linerless label a laminate is printed, opened, rearranged and relaminated, and the stiffness of one or more of the films will facilitate the processability and handling of the films in the process. Also the increased stiffness will help the processability of the linerless end product for example in the dispensing machine when the labels are separated and/or fed to the items to be labelled. Also in the washing phase the increased stiffness will facilitate the washability of the labels.

As in some embodiments the print is on a printable surface between the first film and the second film, it provides an effect of being protected against any wearing or contamination during the production, storage, transportation and use. Further, during the washing of the labels the print ink will not be washed off to contaminate the washing solution and/or the recyclable materials of the containers.

One embodiment provides a face laminate comprising the following layers in the following order:

a second shrinkable uniaxially oriented film, a print layer, a second adhesive layer, a first shrinkable uniaxially oriented film which is oriented in different direction to the second shrinkable uniaxially oriented film, and a first adhesive layer comprising pressure sensitive adhesive. In this embodiment the first side of the second shrinkable uniaxially oriented film has been printed.

One embodiment provides a face laminate comprising the following layers in the following order:

a print layer, a second shrinkable uniaxially oriented film, a second adhesive layer, a first shrinkable uniaxially oriented film which is oriented in different direction to the second shrinkable uniaxially oriented film, and a first adhesive layer comprising pressure sensitive adhesive.

One embodiment provides a face laminate comprising the following layers in the following order:

a second shrinkable uniaxially oriented film, a second adhesive layer, a print layer, a first shrinkable uniaxially oriented film which is oriented in different direction to the second shrinkable uniaxially oriented film, and a first adhesive layer comprising pressure sensitive adhesive. In this embodiment the second side of the first shrinkable uniaxially oriented film has been printed.

In one embodiment the first shrinkable uniaxially oriented film is non-annealed or it is annealed to a very low extent. In one embodiment the second shrinkable uniaxially oriented film is non-annealed or it is annealed to a very low extent. This allows the films to be shrinkable. In one embodiment at least one of the films is non-annealed.

The areal shrinkage of the first shrinkable uniaxially oriented film in the direction of the orientation is at least 5% at 80° C., for example at least 10%, such as in the range of 5-80% or in the range of 10-80%. In one example the areal shrinkage is in the range of 40-80%. In one example the areal shrinkage is in the range of 50-70%. The areal shrinkage may be defined for example by using standards AST D1204 or ASTM D2732, for example using liquid, such as water, as the heating medium at 80° C. for at least 3 minutes, or using air as the heating medium at 80° C. for at least 3 minutes. In one embodiment the tensile modulus (ASTM D882) of the first shrinkable uniaxially oriented film in the direction of the orientation is 0.8-3.0 GPa after immersion in water at 80° C. for at least 3 minutes.

The areal shrinkage of the second shrinkable uniaxially oriented film in the direction of the orientation is at least 5% at 80° C., for example at least 10%, such as in the range of 5-80% or in the range of 10-80%. In one example the areal shrinkage is in the range of 40-80%. In one example the areal shrinkage is in the range of 50-70%. The areal shrinkage may be defined for example by using standards AST D1204 or ASTM D2732, for example using air as the heating medium at 80° C. for at least 3 minutes, or using liquid, such as water, as the heating medium at 80° C. for at least 3 minutes. In one embodiment the tensile modulus (ASTM D882) of the second shrinkable uniaxially oriented film in the direction of the orientation is 0.8-3.0 GPa after immersion in water at 80° C. for at least 3 minutes.

In one embodiment the first uniaxially oriented film is annealed. In this case it may have an areal shrinkage of less than 5%, for example less than 2% or less than 1%.

Said face laminate may be prepared from a printable laminate having a printable surface, which laminate may be provided as a self-wound roll.

One embodiment provides a printable laminate comprising multiple layers in the following order:

a first shrinkable uniaxially oriented film, a first adhesive layer comprising a pressure sensitive adhesive, a release layer comprising a release agent, and a second shrinkable uniaxially oriented film which is oriented in different direction to the first shrinkable uniaxially oriented film.

The orientations of first shrinkable uniaxially oriented film and the second shrinkable uniaxially oriented film may differ at least by 20 degrees, for example at least by about 45 degrees, or at least by about 60 degrees. In most cases the orientations of first shrinkable uniaxially oriented film and the second shrinkable uniaxially oriented film are substantially perpendicular to each other, i.e. they differ by about 90 degrees. In one embodiment the orientations of first shrinkable uniaxially oriented film and the second shrinkable uniaxially oriented film are perpendicular to each other. Usually one orientation is in machine direction and the other is in cross direction (or transverse direction).

In practice such a face laminate is shrinkable (or having an areal shrinkage) in both different directions at least 5% at 80° C. forming in an elevated temperature two curling forces to said different directions. In one embodiment the face laminate is shrinkable in both different directions at least 10%, or at least 20%, or at least 30%. In the tests a shrinkage of about 40% or higher was easily achieved. As a comparison to a label having only machine direction oriented film(s), such film would not shrink substantially in the vertical direction (less than 5%).

As the machine direction oriented film is generally stiffer, the shrink force thereof is greater and it is less expensive to manufacture, it is advantageous to have a certain percentage of MD oriented film in the laminate, usually in the range of 20-80% (w/w). In one embodiment the first and second film together contain at least 30% (w/w) of machine direction oriented film, preferably at least 40% (w/w). In one embodiment the first and second film together contain at least 50% (w/w) of machine direction oriented film. In one embodiment the first and second film together contain at least 60% (w/w) of machine direction oriented film. The content of machine direction oriented film in the first and second film together may be in the range of 50-80%, or in the range of 60-80%.

In one embodiment the second shrinkable uniaxially oriented film is cross-direction (CD) oriented film and the first shrinkable uniaxially oriented film is machine-direction (MD) oriented film.

One embodiment provides a method for preparing a printed linerless face laminate, the method comprising providing said laminate comprising a first shrinkable uniaxially oriented film which is oriented in different direction to the second shrinkable uniaxially oriented film;

printing on the printable surface;

separating from the laminate the first shrinkable uniaxially oriented film, and the adhesive layer comprising a pressure sensitive adhesive, from the second shrinkable uniaxially oriented film;

rearranging the release layer comprising a release agent and the second shrinkable uniaxially oriented film on top of the first shrinkable uniaxially oriented film, and the adhesive layer comprising a pressure sensitive adhesive, with the release layer comprising a release agenton top of the face laminate; and laminating the first film and the second film together with a second adhesive layer, to form the linerless printed face laminate.

One embodiment provides a method for preparing a printed linerless face laminate, the method comprising providing said laminate;

printing on the printable surface;

separating from the laminate the first shrinkable uniaxially oriented film, the first adhesive layer comprising a pressure sensitive adhesive, from the release layer comprising a release agent and the second shrinkable uniaxially oriented film, rearranging the release layer comprising a release agent and the second shrinkable uniaxially oriented film on top of the first shrinkable uniaxially oriented film, and the first adhesive layer comprising a pressure sensitive adhesive, with the release layer comprising a release agent on top of the face laminate;

laminating the first film and the second film together with a second adhesive layer, to form the printed face laminate. The second adhesive layer may be applied onto the first shrinkable uniaxially oriented film or onto the second shrinkable uniaxially oriented film. One embodiment comprises printing on the printable surface of the first shrinkable uniaxially oriented film. One embodiment comprises printing on the printable surface of the second shrinkable uniaxially oriented film. The printing may be carried out before or after the separation step.

One example of the labelled item is a labelled PET item comprising a printed face laminate attached to a surface of the item, the face laminate comprising the following layers in the following order:

a second shrinkable uniaxially oriented film, a print layer, a second adhesive layer, a first shrinkable uniaxially oriented film which is oriented in perpendicular direction to the second shrinkable uniaxially oriented film, and a first adhesive layer comprising pressure sensitive adhesive.

One example of the labelled item is a labelled PET item comprising a printed face laminate attached to a surface of the item, the face laminate comprising the following layers in the following order:

a second shrinkable uniaxially oriented film, a second adhesive layer, a print layer a first shrinkable uniaxially oriented film which is oriented in perpendicular direction to the second shrinkable uniaxially oriented film, and a first adhesive layer comprising pressure sensitive adhesive.

One example of the labelled item is a labelled glass item comprising a printed face laminate attached to a surface of the item, the face laminate comprising the following layers in the following order:

a second shrinkable uniaxially oriented film, a print layer, a second adhesive layer, a first shrinkable uniaxially oriented film which is oriented in perpendicular direction to the second shrinkable uniaxially oriented film, and a first adhesive layer comprising pressure sensitive adhesive.

One example of the labelled item is a labelled glass item comprising a printed face laminate attached to a surface of the item, the face laminate comprising the following layers in the following order:

a second shrinkable uniaxially oriented film, a second adhesive layer, a print layer, a first shrinkable uniaxially oriented film which is oriented in perpendicular direction to the second shrinkable uniaxially oriented film, and a first adhesive layer comprising pressure sensitive adhesive.

One example of the labelled item is a labelled polyolefin item comprising a printed face laminate attached to a surface of the item, the face laminate comprising the following layers in the following order:

a second shrinkable uniaxially oriented film, a print layer, a second adhesive layer, a first shrinkable uniaxially oriented film which is oriented in perpendicular direction to the second shrinkable uniaxially oriented film, and a first adhesive layer comprising pressure sensitive adhesive.

One example of the labelled item is a labelled polyolefin item comprising a printed face laminate attached to a surface of the item, the face laminate comprising the following layers in the following order:

a second shrinkable uniaxially oriented film, a second adhesive layer, a print layer,

- a first shrinkable uniaxially oriented film which is oriented in perpendicular direction to the second shrinkable uniaxially oriented film, and
- a first adhesive layer 105 comprising pressure sensitive adhesive.

Different combinations of polymers or derivatives thereof disclosed herein may be applied to the first shrinkable uniaxially oriented film and to the second shrinkable uniaxially oriented film. The following examples include the polymers as such and the derivatives thereof. In one example the first shrinkable uniaxially oriented film comprises polyethylene and the second shrinkable uniaxially oriented film comprises polyethylene. In one example the first shrinkable uniaxially oriented film comprises polyethylene and the second shrinkable uniaxially oriented film comprises polypropylene. In one example the first shrinkable uniaxially oriented film comprises polyethylene and the second shrinkable uniaxially oriented film comprises polyethylene terephthalate. In one example the first shrinkable uniaxially oriented film comprises polyethylene and the second shrinkable uniaxially oriented film comprises PVC. In one example the first shrinkable uniaxially oriented film comprises polyethylene and the second shrinkable uniaxially oriented film comprises polyester. In one example the first shrinkable uniaxially oriented film comprises polyethylene and the second shrinkable uniaxially oriented film comprises polystyrene. In one example the first shrinkable uniaxially oriented film comprises polyethylene and the second shrinkable uniaxially oriented film comprises polylactic acid. In one example the first shrinkable uniaxially oriented film comprises polyethylene and the second shrinkable uniaxially oriented film comprises cyclic olefin (co)polymer.

In one example the first shrinkable uniaxially oriented film comprises polypropylene and the second shrinkable uniaxially oriented film comprises polyethylene. In one example the first shrinkable uniaxially oriented film comprises polypropylene and the second shrinkable uniaxially oriented film comprises polypropylene. In one example the first shrinkable uniaxially oriented film comprises polypropylene and the second shrinkable uniaxially oriented film comprises polyethylene terephthalate. In one example the first shrinkable uniaxially oriented film comprises polypropylene and the second shrinkable uniaxially oriented film comprises PVC. In one example the first shrinkable uniaxially oriented film comprises polypropylene and the second shrinkable uniaxially oriented film comprises polyester. In one example the first shrinkable uniaxially oriented film comprises polypropylene and the second shrinkable uniaxially oriented film comprises polystyrene. In one example the first shrinkable uniaxially oriented film comprises polypropylene and the second shrinkable uniaxially oriented film comprises polylactic acid. In one example the first shrinkable uniaxially oriented film comprises polypropylene and the second shrinkable uniaxially oriented film comprises cyclic olefin (co)polymer.

In one example the first shrinkable uniaxially oriented film comprises polyethylene terephthalate and the second shrinkable uniaxially oriented film comprises polyethylene. In one example the first shrinkable uniaxially oriented film comprises polyethylene terephthalate and the second shrinkable uniaxially oriented film comprises polypropylene. In one example the first shrinkable uniaxially oriented film comprises polyethylene terephthalate and the second shrinkable uniaxially oriented film comprises polyethylene terephthalate. In one example the first shrinkable uniaxially oriented film comprises polypropylene and the second shrinkable uniaxially oriented film comprises PVC. In one example the first shrinkable uniaxially oriented film comprises polyethylene terephthalate and the second shrinkable uniaxially oriented film comprises polyester. In one example the first shrinkable uniaxially oriented film comprises polyethylene terephthalate and the second shrinkable uniaxially oriented film comprises polystyrene. In one example the first shrinkable uniaxially oriented film comprises polyethylene terephthalate and the second shrinkable uniaxially oriented film comprises polylactic acid. In one example the first shrinkable uniaxially oriented film comprises polyethylene terephthalate and the second shrinkable uniaxially oriented film comprises cyclic olefin (co)polymer.

In one example the first shrinkable uniaxially oriented film comprises PVC and the second shrinkable uniaxially oriented film comprises polyethylene. In one example the first shrinkable uniaxially oriented film comprises PVC and the second shrinkable uniaxially oriented film comprises polypropylene. In one example the first shrinkable uniaxially oriented film comprises PVC and the second shrinkable uniaxially oriented film comprises polyethylene terephthalate. In one example the first shrinkable uniaxially oriented film comprises PVC and the second shrinkable uniaxially oriented film comprises PVC. In one example the first shrinkable uniaxially oriented film comprises PVC and the second shrinkable uniaxially oriented film comprises polyester.

In one example the first shrinkable uniaxially oriented film comprises PVC and the second shrinkable uniaxially oriented film comprises polystyrene. In one example the first shrinkable uniaxially oriented film comprises PVC and the second shrinkable uniaxially oriented film comprises polylactic acid. In one example the first shrinkable uniaxially oriented film comprises PVC and the second shrinkable uniaxially oriented film comprises cyclic olefin (co)polymer.

In one example the first shrinkable uniaxially oriented film comprises polyester and the second shrinkable uniaxially oriented film comprises polyethylene. In one example the first shrinkable uniaxially oriented film comprises polyester and the second shrinkable uniaxially oriented film comprises polypropylene. In one example the first shrinkable uniaxially oriented film comprises polyester and the second shrinkable uniaxially oriented film comprises polyethylene terephthalate. In one example the first shrinkable uniaxially oriented film comprises polyester and the second shrinkable uniaxially oriented film comprises PVC. In one example the first shrinkable uniaxially oriented film comprises polyester and the second shrinkable uniaxially oriented film comprises polyester. In one example the first shrinkable uniaxially oriented film comprises polyester and the second shrinkable uniaxially oriented film comprises polystyrene. In one example the first shrinkable uniaxially oriented film comprises polyester and the second shrinkable uniaxially oriented film comprises polylactic acid. In one example the first shrinkable uniaxially oriented film comprises polyester and the second shrinkable uniaxially oriented film comprises cyclic olefin (co)polymer.

In one example the first shrinkable uniaxially oriented film comprises polystyrene and the second shrinkable uniaxially oriented film comprises polyethylene. In one example the first shrinkable uniaxially oriented film comprises polystyrene and the second shrinkable uniaxially oriented film comprises polypropylene. In one example the first shrinkable uniaxially oriented film comprises polystyrene and the second shrinkable uniaxially oriented film comprises polyethylene terephthalate. In one example the first shrinkable uniaxially oriented film comprises polystyrene and the second shrinkable uniaxially oriented film comprises PVC. In one example the first shrinkable uniaxially oriented film comprises polystyrene and the second shrinkable uniaxially oriented film comprises polyester. In one example the first shrinkable uniaxially oriented film comprises polystyrene and the second shrinkable uniaxially oriented film comprises polystyrene. In one example the first shrinkable uniaxially oriented film comprises polystyrene and the second shrinkable uniaxially oriented film comprises polylactic acid. In one example the first shrinkable uniaxially oriented film comprises polystyrene and the second shrinkable uniaxially oriented film comprises cyclic olefin (co)polymer.

In one example the first shrinkable uniaxially oriented film comprises polylactic acid and the second shrinkable uniaxially oriented film comprises polyethylene. In one example the first shrinkable uniaxially oriented film comprises polylactic acid and the second shrinkable uniaxially oriented film comprises polypropylene. In one example the first shrinkable uniaxially oriented film comprises polylactic acid and the second shrinkable uniaxially oriented film comprises polyethylene terephthalate. In one example the first shrinkable uniaxially oriented film comprises polylactic acid and the second shrinkable uniaxially oriented film comprises PVC. In one example the first shrinkable uniaxially oriented film comprises polylactic acid and the second shrinkable uniaxially oriented film comprises polyester. In one example the first shrinkable uniaxially oriented film comprises polylactic acid and the second shrinkable uniaxially oriented film comprises polystyrene. In one example the first shrinkable uniaxially oriented film comprises polylactic acid and the second shrinkable uniaxially oriented film comprises polylactic acid. In one example the first shrinkable uniaxially oriented film comprises polylactic acid and the second shrinkable uniaxially oriented film comprises cyclic olefin (co)polymer.

In one example the first shrinkable uniaxially oriented film comprises cyclic olefin (co)polymer and the second shrinkable uniaxially oriented film comprises polyethylene. In one example the first shrinkable uniaxially oriented film comprises cyclic olefin (co)polymer and the second shrinkable uniaxially oriented film comprises polypropylene. In one example the first shrinkable uniaxially oriented film comprises cyclic olefin (co)polymer and the second shrinkable uniaxially oriented film comprises polyethylene terephthalate. In one example the first shrinkable uniaxially oriented film comprises cyclic olefin (co)polymer and the second shrinkable uniaxially oriented film comprises PVC. In one example the first shrinkable uniaxially oriented film comprises cyclic olefin (co)polymer and the second shrinkable uniaxially oriented film comprises polyester. In one example the first shrinkable uniaxially oriented film comprises cyclic olefin (co)polymer and the second shrinkable uniaxially oriented film comprises polystyrene. In one example the first shrinkable uniaxially oriented film comprises cyclic olefin (co)polymer and the second shrinkable uniaxially oriented film comprises polylactic acid. In one example the first shrinkable uniaxially oriented film comprises cyclic olefin (co)polymer and the second shrinkable uniaxially oriented film comprises cyclic olefin (co)polymer.

The following numbered items provide embodiments relating to labels having two uniaxially oriented films oriented in different directions.

1. A washable face laminate having a printable surface and comprising the following layers in the following order:
- a second shrinkable uniaxially oriented film,
- a second adhesive layer,
- a first shrinkable uniaxially oriented film, which is oriented in different direction to the second shrinkable uniaxially oriented film, and
- a first adhesive layer comprising pressure sensitive adhesive.

2. The face laminate of item 1, wherein the face laminate is shrinkable in both different directions at least 5% at 80° C. forming in an elevated temperature two curling forces to said different directions.

3. The face laminate of item 1 or 2, wherein the orientations of the first shrinkable uniaxially oriented film and the second shrinkable uniaxially oriented film differ at least by 20 degrees, preferably at least by 45 degrees.

4. The face laminate of item 1 or 2, wherein the orientations of the first shrinkable uniaxially oriented film and the second shrinkable uniaxially oriented film are perpendicular to each other.

5. The face laminate of any of the items 1-5 comprising the following layers in the following order:
- a print layer,
- a second shrinkable uniaxially oriented film,
- a second adhesive layer,
- a first shrinkable uniaxially oriented film, and
- a first adhesive layer comprising pressure sensitive adhesive.

6. The face laminate of any of the items 1-5 comprising the following layers in the following order:
- a release layer comprising a release agent
- a second shrinkable uniaxially oriented film,
- a print layer,
- a second adhesive layer,
- a first shrinkable uniaxially oriented film, and
- a first adhesive layer comprising pressure sensitive adhesive.

7. The face laminate of any of the items 1-5 comprising the following layers in the following order:
- a release layer comprising a release agent
- a second shrinkable uniaxially oriented film,
- a second adhesive layer,
- a print layer,
- a first shrinkable uniaxially oriented film, and
- a first adhesive layer comprising pressure sensitive adhesive.

8. A laminate having a printable surface and comprising multiple layers in the following order:
- a first shrinkable uniaxially oriented film,
- a first adhesive layer comprising a pressure sensitive adhesive,
- a release layer comprising a release agent, and
- a second shrinkable uniaxially oriented film which is oriented in different direction to the first shrinkable uniaxially oriented film.

9. The laminate of item 8, wherein the orientations of the first shrinkable uniaxially oriented film and the second shrinkable uniaxially oriented film differ at least by 20 degrees, preferably at least by 45 degrees.

10. The laminate of item 8, wherein the orientations of the first shrinkable uniaxially oriented film and the second shrinkable uniaxially oriented film are perpendicular to each other.

11. The face laminate of any of the items 1-7, wherein the total thickness of the face laminate is in the range of 20-100 μm.

12. The face laminate of any of the items 1-7 or the laminate of any of the items 8-10, wherein the first and the second film together contain at least 30% (w/w) of machine direction oriented film, preferably at least 40% (w/w).

13. The face laminate of any of the items 1-7 having a stiffness of at least 1 mN/m, preferably at least 3 mN/m.

14. The face laminate of any of the items 1-7 or 11-13 or the laminate of any of the items 8-10 or 12, wherein the first shrinkable uniaxially oriented film has a printable surface.

15. The face laminate of any of the items 1-7 or 11-13 or the laminate of any of the items 8-10 or 12, wherein the second shrinkable uniaxially oriented film has a printable surface.

16. The face laminate of any of the items 1-7 or 11-15 or the laminate of any of the items 8-10 or 12-15, wherein the first shrinkable uniaxially oriented film is a MD-oriented film and the second shrinkable uniaxially oriented film is a CD-oriented film.

17. The face laminate of any of the items 1-7 or 11-15 or the laminate of any of the items 8-10 or 12-15, wherein the first shrinkable uniaxially oriented film is a CD-oriented film and the second shrinkable uniaxially oriented film is a MD-oriented film.

18. The face laminate of any of the items 1-7 or 11-17 or the laminate of any of the items 8-10 or 12-17, wherein the first shrinkable uniaxially oriented film is non-annealed.

19. The face laminate of any of the items 1-7 or 11-18 or the laminate of any of the items 8-10 or 12-18, wherein the second shrinkable uniaxially oriented film is non-annealed.

20. The face laminate of any of the items 1-7 or 11-18 or the laminate of any of the items 8-10 or 12-18, wherein the first shrinkable uniaxially oriented film is annealed.

21. The face laminate of any of the items 1-7 or 11-20 or the laminate of any of the items 8-10 or 12-20, wherein at least one of the films is non-annealed.

22. The face laminate of any of the items 1-7 or 11-21 or the laminate of any of the items 8-10 or 12-21, wherein the second shrinkable uniaxially oriented film has an areal shrinkage in the direction of the orientation of at least 5% at 80° C.

23. The face laminate of any of the items 1-7 or 11-21 or the laminate of any of the items 8-10 or 12-21, wherein the second shrinkable uniaxially oriented film has an areal shrinkage in the direction of the orientation in the range of 10-80% at 80° C.

24. The face laminate of any of the items 1-7, 11-19 or 21-23 or the laminate of any of the items 8-10, 12-19 or 21-23, wherein the first shrinkable uniaxially oriented film has an areal shrinkage in the direction of the orientation of at least 5% at 80° C.

25. The face laminate of any of the items 1-7, 11-19 or 21-23 or the laminate of any of the items 8-10, 12-19 or 21-23, wherein the first shrinkable uniaxially oriented film has an areal shrinkage in the direction of the orientation in the range of 10-80% at 80° C.

26. The face laminate of any of the items 1-7 or 11-25 or the laminate of any of the items 8-10 or 12-25, wherein the second shrinkable uniaxially oriented film comprises polyethylene.

27. The face laminate of any of the items 1-7 or 11-25 or the laminate of any of the items 8-10 or 12-25, wherein the second shrinkable uniaxially oriented film comprises polypropylene.

28. The face laminate of any of the items 1-7 or 11-25 or the laminate of any of the items 8-10 or 12-25, wherein the second shrinkable uniaxially oriented film comprises polyethylene terephthalate.

29. The face laminate of any of the items 1-7 or 11-25 or the laminate of any of the items 8-10 or 12-25, wherein the second shrinkable uniaxially oriented film comprises PVC.

30. The face laminate of any of the items 1-7 or 11-25 or the laminate of any of the items 8-10 or 12-25, wherein the second shrinkable uniaxially oriented film comprises polyester.

31. The face laminate of any of the items 1-7 or 11-25 or the laminate of any of the items 8-10 or 12-25, wherein the second shrinkable uniaxially oriented film comprises polystyrene.

32. The face laminate of any of the items 1-7 or 11-25 or the laminate of any of the items 8-10 or 12-25, wherein the second shrinkable uniaxially oriented film comprises polylactic acid.

33. The face laminate of any of the items 1-7 or 11-25 or the laminate of any of the items 8-10 or 12-25, wherein the second shrinkable uniaxially oriented film comprises cyclic olefin (co)polymer.

34. The face laminate of any of the items 1-7 or 11-33 or the laminate of any of the items 8-10 or 12-33, wherein the first shrinkable uniaxially oriented film comprises polyethylene.

35. The face laminate of any of the items 1-7 or 11-33 or the laminate of any of the items 8-10 or 12-33, wherein the first shrinkable uniaxially oriented film comprises polypropylene.

36. The face laminate of any of the items 1-7 or 11-33 or the laminate of any of the items 8-10 or 12-3 wherein the first shrinkable uniaxially oriented film comprises polyethylene terephthalate.

37. The face laminate of any of the items 1-7 or 11-33 or the laminate of any of the items 8-10 or 12-33, wherein the first shrinkable uniaxially oriented film comprises PVC.

38. The face laminate of any of the items 1-7 or 11-33 or the laminate of any of the items 8-10 or 12-33, wherein the first shrinkable uniaxially oriented film comprises polyester.

39. The face laminate of any of the items 1-7 or 11-33 or the laminate of any of the items 8-10 or 12-33, wherein the first shrinkable uniaxially oriented film comprises polystyrene.

40. The face laminate of any of the items 1-7 or 11-33 or the laminate of any of the items 8-10 or 12-33, wherein the first shrinkable uniaxially oriented film comprises polylactic acid.

41. The face laminate of any of the items 1-7 or 11-33 or the laminate of any of the items 8-10 or 12-33, wherein the first shrinkable uniaxially oriented film comprises cyclic olefin (co)polymer.

42. The face laminate of any of the items 1-7 or 11-41 or the laminate of any of the items 8-10 or 12-41, wherein the pressure sensitive adhesive comprises UV hot melt adhesive.

43. The face laminate of any of the items 1-7 or 11-42 or the laminate of any of the items 8-10 or 12-42, wherein the releasing agent comprises silicone, preferably UV curable silicone.

44. The face laminate of any of the items 1-7 or 11-43 or the laminate of any of the items 8-10 or 12-43, wherein the second adhesive layer comprises adhesive selected from UV curable adhesive and polyurethane adhesive.

45. The face laminate of any of the items 1-7 or 11-44 or the laminate of any of the items 8-10 or 12-44, having a total average density of less than 1.0 g/cm$^3$.

46. The face laminate of any of the items 1-7 or 11-44 or the laminate of any of the items 8-10 or 12-44, having a total average density of at least 1.0 g/cm$^3$.

47. The face laminate of any of the items 1-4,6-7, 11-27, 34-35, or 45-46 comprising multiple layers in the following order:

a release layer comprising a release agent,
a film layer comprising a polyolefin film,
a second adhesive layer,
a film layer comprising a polyolefin film, and
a first adhesive layer comprising a pressure sensitive adhesive.

48. The face laminate of any of the items 1-4,6-7, 11-27, 36, or 45-46 comprising multiple layers in the following order:

a release layer comprising a release agent,
a film layer comprising a polyolefin film,
a second adhesive layer,
a film layer comprising a polyester film, and
a first adhesive layer comprising a pressure sensitive adhesive.

49. The face laminate of any of the items 1-4,6-7, 11-26, 28, 36, or 45-46 comprising multiple layers in the following order:

a release layer comprising a release agent,
a film layer comprising a polyester film,
a second adhesive layer,
a film layer comprising a polyester film, and
a first adhesive layer comprising a pressure sensitive adhesive.

50. The face laminate of any of the items 1-7 or 11-46 or the laminate of any of the items 8-10 or 12-46, further comprising a release layer comprising a release agent attached to the adhesive layer comprising a pressure sensitive adhesive, and
a liner.

51. The face laminate of any of the items 1-7 or 11-49, wherein the face laminate is a linerless face laminate.

52. A labelled item having the washable face laminate of any of the items 1-7 or 11-51 attached to a surface.

53. A labelled PET item having the washable face laminate of item 47 attached to a surface.

54. A labelled glass item having the washable face laminate of item 49 attached to a surface.

55. A method for preparing a washable printed linerless face laminate, the method comprising providing the laminate of any of the items 8-10 or 12-46, printing on the printable surface;

separating from the laminate
the first shrinkable uniaxially oriented film,
the first adhesive layer comprising a pressure sensitive adhesive, from
the second shrinkable uniaxially oriented film;
rearranging
the release layer comprising a release agent and
the second shrinkable uniaxially oriented film
on top of
the first shrinkable uniaxially oriented film, and
the first adhesive layer comprising a pressure sensitive adhesive, with the release layer on top of the face laminate; and
laminating the first film and the second film together with a second adhesive layer, to form the printed face laminate.

56. The method of item 55, comprising applying the second adhesive layer on the second film before separating.

57. The method of item 55, comprising applying the second adhesive layer on the first film before separating.

58. The method of item 55, comprising applying the second adhesive layer on the second film after separating.

59. The method of item 55, comprising applying the second adhesive layer on the first film after separating.

60. The method of item 55, comprising printing on the printable surface of the first shrinkable uniaxially oriented film.

61. The method of item 55, comprising printing on the printable surface of the second shrinkable uniaxially oriented film.

Labels of the embodiments are suitable to be washed off in the standard washing conditions of recyclable containers, such as glass containers, at temperatures in the range of 60-90° C., or 65-85° C., or preferably at temperatures above 77° C. in aqueous solution. For polyester or plastic containers the washing temperature may be 65-75° C., or even higher such as about 80° C. Washing liquid usually comprises caustic soda, for example sodium hydroxide. The washing liquid may be 2-4%, preferably 2% alkaline water. The wash-off is accomplished in few minutes, like 1-3 minutes, or less than 3 minutes, or preferably less than 2 minutes. At a washing conditions a label is exposed to a washing liquid of certain temperature. In one example the labelled bottles go into a pre-wash chamber at 50° C. for about one minute before they go into the washing chamber at 80° C.

Plastic containers are washed at lower temperatures compared to glass containers, for example. Wash temperature of plastic bottles is 65-75° C. A plastic container typically exhibits heat shrinkage during wash. Plastic containers are usually crushed during the wash. The plastic container and the label on it may be crushed into small pieces, for example in the order of 1×1 cm. In this case a label may be removed from some of the pieces of the container with aid of reduced adhesive force and shrinkage of the container due to washing conditions. Expansion of a label layer next to the container may enhance this removal. Pieces of labels are attached to some pieces of containers. Smaller area of attachment between article and label may require less time and/or smaller force in order to be detached from a piece of article. Securing maintaining ink and adhesive between label layers is important factor in this application. Even if label gets broke during the wash, the washing liquid shall not be contaminated. Labels or parts of labels are not dissolved in water. A label remains its laminated construction even when split in pieces. The washed plastic parts of the container are recycled, and shall not contain residues.

Die-Cutting

In one embodiment the method for preparing the linerless face laminate comprises die-cutting the laminate or label construction through all the layers to form a predefined shape for the laminate or the face laminate, and defining a bridge between individual shapes to form a laminate or face laminate web having plurality of individual shapes attached to each other. The die-cutting generally refers to a method of using a die to shear the web of the laminate, i.e. mechanical or contacting die-cutting. In one example a dinking die is used in a dinking process. It is also possible to cut through only a one or more layers of a laminate in a process called kiss cutting. However, in the present embodiments the cutting is generally done through all the layers. Die cutting may be done for example as flatbed or rotary die cutting. The rotary die cutting is faster and may be preferred when making labels. In one specific embodiment the die-cutting is carried out by laser die-cutting method using a laser die-cutting device, which is a contactless die-cutting method.

In one embodiment the separating, rearranging and laminating (delamination and lamination) are carried out before the die-cutting. In such case it is the printed face laminate web which is die-cut to provide pre-cut printed face laminate web.

In one embodiment the separating, rearranging and laminating (delamination and lamination) are carried out after the die-cutting. In such case it is the laminate web which is die-cut to provide pre-cut laminate web. Said laminate may be printed or unprinted. This embodiment is especially useful when the laminate web contains only one line of predefined label shapes.

Figure 9:
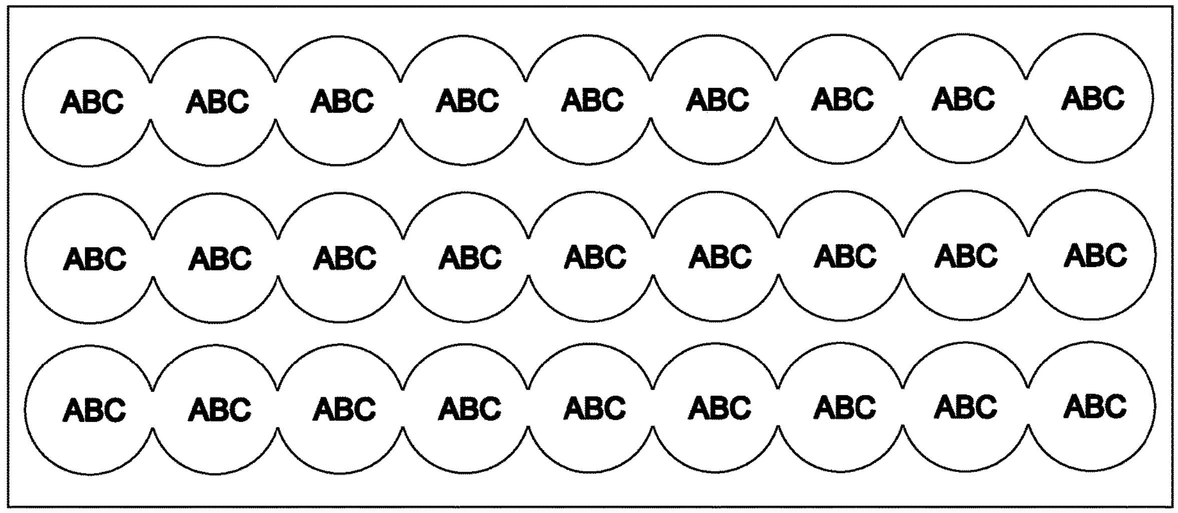
FIG. 9 illustrates a printed label web comprising three lines of die-cut shapes

The predefined shape refers to a general shape of the label to be produced. The shape may be round or angular or having both angular and arched shapes, such as a round, elliptical, square or the like. Examples of such shapes include labels for bottles and cans. A laminate or face laminate web may to contain one or more than one parallel lines of said predefined shapes, such as two, three, four, five, six, seven, eight, nine or ten or more lines. FIG. 9 shows an example of a printed web having three of such parallel lines of the predefined shapes.

Figure 11:
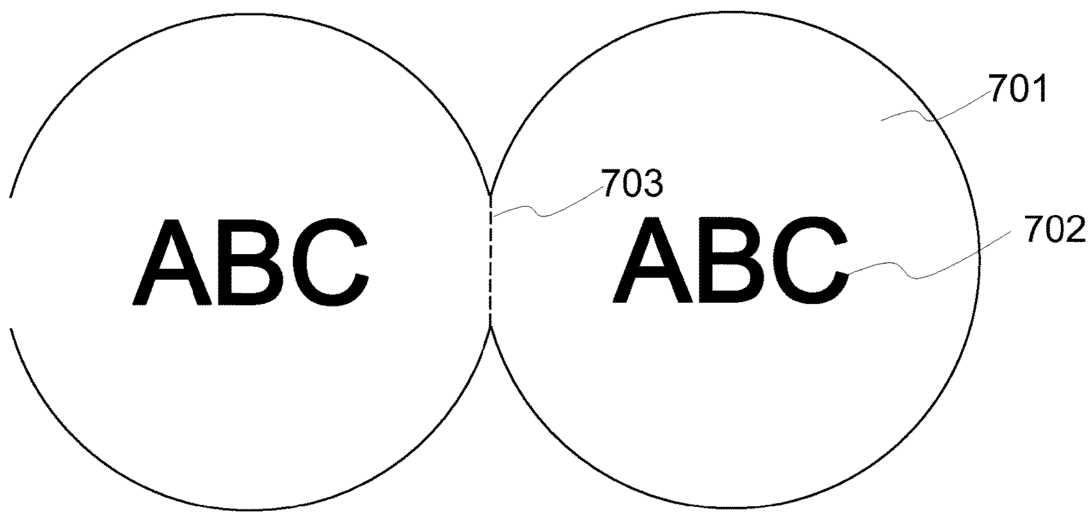
FIG. 11 illustrates a close-up view of two die-cut shapes with a connecting bridge

An bridge is defined between the individual shapes, meaning that a portion of the laminate or the face laminate is not die-cut to obtain said bridge. Said bridge allows the shapes to be attached to each other to form a long web with repeated similar units. The bridge is wide enough to keep the individual face laminates together but narrow enough so that it can be easily cut with for example a contactless cutting method, for example in a dispensing machine, or separated by mechanical force. For example the width of the bridge may be about 5-100 mm, for example 10-50 mm, depending on the width of the predefined shapes. In one embodiment as shown in FIG. 11 the die-cut part of the predefined shape 701 having a print 702 contains arched shapes and the bridging part 703 is arranged to be cut or separated as a straight line.

No cut matrix material around the individual shapes is present as the waste matrix is removed after die-cutting. No uncut portions connect the waste matrix to the individual shapes. The term "bridge" refers to a part of the laminate between the individual shapes of the final product which may be weakened or not weakened. Also a term "uncut bridge" may be used to indicate that a part of the laminate has not been cut to obtain said bridge between the individual shapes.

In one embodiment the bridge is not weakened. In such a case the bridge must be long or strong enough to provide a durable connective portion between separate labels during the handling of the web. For example, the facestock web should not break in the process, such as when it proceeds in the machinery. A bridge which is not weakened enables high speed in the manufacturing and/or labelling process. Also cutting with a separate cutting means at the labelling process provides generally a more finished edge of the final label.

In one embodiment the bridge is weakened. Weakening refers to any mechanical, chemical or other process (e.g. by laser) of weakening the bridging portion, for example perforations, thinning, partially cutting or the like for enabling mechanical separation of the individual labels later on for example by tearing. Partial cutting refers to any type of cutting wherein only part of the bridge has been cut, for example the laminate is cut half-way through or through only one or more layers but not through all the layers of a laminate, for example by kiss cutting, or there are a plurality of elongated cuts in line separated by a non-cut portion. The latter may also considered as a perforation. In one embodiment the method comprises weakening the bridge, for example by perforating, thinning, kiss cutting or partial cutting.

Perforation as used herein generally refers to a plurality of perforation holes or cuts which define a line for allowing an easy separation of the two parts. Perforation or other type of weakening may be desired as to ease the separation of the labels from each other during dispensing by tearing the material with mechanical force and producing a tear line at the weakened part of the bridge.

The dispensing process for weakened bridges may be naturally somewhat different from the not weakened bridges. The latter typically requires some sort of cutting aid to separate the individual labels from each other during the label dispensing process. The former may rely solely on mechanical force to produce a tear line at the weakened position, for example at the perforated bridge, which has been produced earlier into the continuous label web during label converting, die-cutting and/or printing process. "Dispensing" as used herein refers to a step of labelling, where the labels are released from the continuous label web and subsequently applied onto the surface of the items to be labelled. A weakened bridge enables the use of more compact or simple dispensing machines because no separate cutting means is required for separating the individual shapes.

In many cases the bridge is cut as a straight line. In one example the bridge is cut as a curved line which produces shapes having inwards curved part on one side and a matching outwards curved part on the other side of the final label. Instead of a simple curved line the cut line may also be more complex having more than one cutting line, such as more than one curved lines, more than one straight lines, or a combination of one or more curved lines and one or more straight lines. Also these types of cutting produce matching cutting lines on the opposite sides of the final label.

After die-cutting any waste material, such as the cut matrix material, is removed. The obtained laminate web may be rolled into a roll for storage and/or transport.

Figure 7:
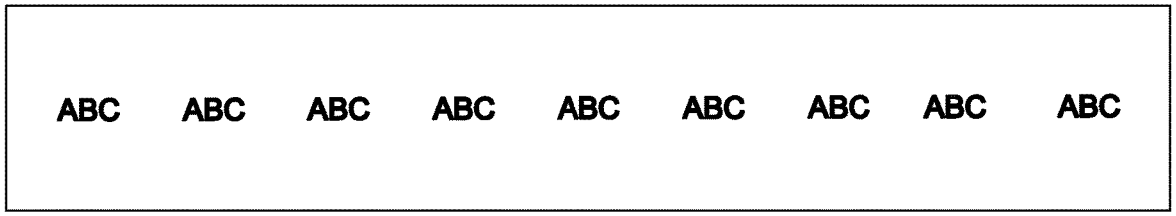
FIG. 7 illustrates a printed label web
Figure 8:
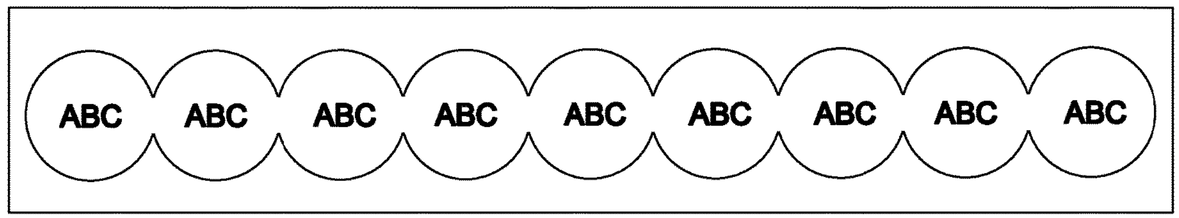
FIG. 8 illustrates a printed label web comprising die-cut shapes

One embodiment comprises printing on the printable surface of the first integral unit before the die-cutting. One embodiment comprises printing on the printable surface of the second integral unit before the die-cutting. One embodiment further comprises separating, rearranging and laminating the printed laminate to form a printed face laminate before the die-cutting. FIG. 7 shows a printed face laminate web before die-cutting and FIG. 8 shows the printed face laminate web after die-cutting wherein the text "ABC" denotes the print.

One embodiment comprises printing on the printable surface of the first integral unit after the die-cutting. One embodiment comprises printing on the printable surface of the second integral unit after the die-cutting. The printing may be carried out in the same or different apparatus as the die-cutting and/or delaminating and/or laminating (or rearranging the first and the second integral units).

In one embodiment the apparatus comprises die-cutting means or unit arranged to die-cut through all the layers of the laminate web or face laminate web to form a predefined shape for the laminate or the face laminate, and to define a bridge between individual shapes to form a laminate web or face laminate web having plurality of individual shapes attached to each other. In one embodiment the apparatus comprises means for weakening the bridge. In one embodiment the means for weakening the bridge comprises means for perforating the bridge. In one embodiment the means for weakening the bridge comprises means for kiss cutting the laminate or the face laminate. In one embodiment the means for weakening the bridge comprises means for partially cutting the laminate or the face laminate.

In one embodiment the die-cutting means or unit are located before the delaminating means. In one embodiment the die-cutting means or unit are located after the laminating means. The locations refer to the locations of said means in the machine direction. Generally the means for weakening the bridge are located after the laminating means.

In one embodiment the means for applying a second adhesive layer are arranged to apply the second adhesive layer onto the second layer 104 of the second integral unit 108, usually before the means for rearranging. In one embodiment the means for applying a second adhesive layer are arranged to apply the second adhesive layer onto the first layer of the first integral unit 107, usually before the means for rearranging.

In an further embodiment the apparatus comprises a printer unit or means for printing arranged to print on the first layer of the first integral unit 107 before the die-cutting means, to form a printed face laminate 110. In an further embodiment the apparatus comprises a printer unit or means for printing arranged to print on the first layer of the first integral unit 107 after the die-cutting unit, to form a printed face laminate 110. In an further embodiment the apparatus comprises a printer unit or means for printing arranged to print on the second layer of the second integral unit 108 before the die-cutting means, to form a printed face laminate 110. In an further embodiment the apparatus comprises a printer unit or means for printing arranged to print on the second layer of the second integral unit 108 after the die-cutting means, to form a printed face laminate 110. In one embodiment the separation and rearrangement is carried out in a dispensing machine and the obtained face laminate is fed directly onto the surfaces of the items to be labelled.

Figure 10:
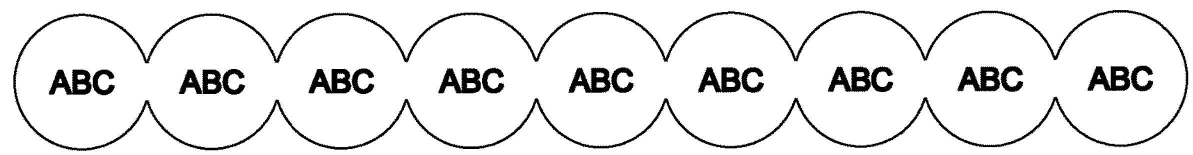
FIG. 10 illustrates a printed label web comprising die-cut shapes wherein the excess matrix material has been removed

In one embodiment, after printing the laminate, any waste material, such as the cut matrix material, is removed. The printed linerless laminate web may be rolled into a roll for storage and/or transport. FIG. 10 shows a printed and die-cut linerless laminate web wherein the excess material has been removed.

The printed linerless face laminate web having plurality of individual shapes attached to each other as shown in FIG. 8 or 9 may be provided from a wound roll to a dispensing machine. In one embodiment the printed face laminate web having plurality of individual shapes attached to each other has been prepared briefly before usage, for example in a dispensing machine.

One embodiment provides a method for preparing separate face laminates or labels, comprising providing the printed face laminate web having plurality of individual shapes attached to each other obtained with said die-cutting method, and separating the individual face laminates by cutting said bridge by contactless or contacting cutting to obtain separate face laminates.

In one embodiment the method further comprises feeding the obtained separate face laminates onto a surface of a product to be labelled. This method is generally carried out in a dispensing machine. In such case the dispensing machine has means for transferring the separated labels onto the surface of the product to be labelled, for example a vacuum drum which may be used to pick up a label. Contactless cutting refers to a method wherein no contact is made with a mechanical cutting die to the face laminate to be cut.

One embodiment provides a method for preparing separate face laminates or labels, comprising providing the printed face laminate web having plurality of individual shapes attached to each other by a weakened bridge, and separating the individual shapes or face laminates by tearing said bridge to obtain separate face laminates. In such case a single face laminate at the end of the web may be partly attached onto the surface of the product to be labelled. The products to be labelled are fed to the dispensing machine. As the product moves or rolls, the force caused by the movement tears the bridge, which may be for example perforated, and a separate face laminate is obtained and attached onto the product. In such case no separate means for transferring and/or separating the labels from the label web are required. In one example the dispensing machine may contain means for breaking the weakened bridge to separate the face laminates.

In one embodiment the contactless cutting method is laser cutting. Laser cutting works by directing the output of a high-power laser, by computer, at the material to be cut. The material then either melts, burns, vaporizes away, or is blown away by a jet of gas, leaving an edge with a high-quality surface finish, which is typical for laser cutting. Generally there are three types of lasers used in the cutting: $CO_2$, Nd and Nd-YAG lasers.

In one embodiment the contactless cutting method is water cutting, which uses a very high-pressure jet of water, or a mixture of water and an abrasive substance. The cutter is commonly connected to a high-pressure water pump where the water is then ejected from the nozzle, cutting through the material by spraying it with the jet of high-speed water.

In one embodiment the contactless cutting method is laser microjet cutting, wherein a pulsed laser beam is coupled into a low-pressure water jet. During cutting the material melts from absorbing the laser power, and the water jet then removes the molten particles from the cut.

In contrast to contacting cutting methods, such as the contacting die-cutting used in the earlier stage, a contactless cutting method allows gentle cutting of the label web having the pressure sensitive adhesive on the outer surface of the web. In the embodiments described herein, the bridge to be cut between the individual labels is relatively short and it can be cut with said contactless means. When the final product, a separate label, is examined, it can be seen that there are two different types of edges in the product. The longest edge may be obtained with the contacting cutting means resulting in a label laminate which has a pressed edge. The shorter areas in the locations wherein the bridges used to be are obtained with the contactless cutting means, which produce different type of cuts. For example the laser cutting produces traces of melting or burning. Water cutter, such as a water jet cutter, provides a cold process. Waterjet cutting does not leave a burr or a rough edge, but the surface of the cut material will appear sand-blasted if any added abrasive material has been used. The preparation process can therefore be easily detected by examining the final product for example by microscope or the like to detect the two types of cut edges obtained with the die-cutting and the contactless cutting methods.

One embodiment provides an apparatus arranged to receive and comprising means for receiving a printed face laminate web having plurality of individual shapes attached to each other and comprising means for carrying out the cutting of the printed face laminate web, such as means for carrying out contactless cutting or means for carrying out contacting cutting. Said means are arranged to cut the bridge portions of the face laminate web before feeding thus separated individual face laminate onto the item to be labelled.

In one embodiment the apparatus is a dispensing machine, which is arranged to prepare and feed the labels to the items to be labelled.

In one embodiment said means for carrying out the contactless cutting comprise laser means, such as a laser device or laser unit for laser cutting. In one embodiment said means for carrying out the contactless cutting comprise water jet means, such as a water jet device or a water jet unit for water cutting. In one embodiment said means for carrying out the contactless cutting comprise laser microjet means, such as a laser microjet cutter device or a laser microjet cutter unit.

One embodiment provides an apparatus arranged to receive and comprising means for receiving a printed face laminate web having plurality of individual shapes attached to each other. This apparatus does not comprise means for carrying out the cutting of the printed face laminate web. In such case the printed laminate web may have bridges which are weakened as described herein. The bridges may have for example perforations or cuttings which enable the separation of the individual shapes, or labels, with mechanical force, such as by tearing.

The apparatus has means for feeding the separated individual face laminates onto the surface of the items to be labelled. There may be provided one or more rolls or drums for feeding the face laminate web to the contactless cutting means for cutting and separating the face laminates and/or one or more rolls for feeding the separated individual face laminate forward to the item to be labelled. Said face laminates are then fed onto plurality of items to be labelled, such as bottles. In one example the means for feeding the separated individual face laminates onto the surface of the items to be labelled comprises a vacuum drum.

Next the embodiments will be explained with reference to an exemplary process and the machinery useful therein.

FIG. 12 illustrates a device arrangement comprising devices needed to carry out the methods of some embodiments. An apparatus for carrying out the invention may contain one or more of the devices or means. A roll 801 of laminate (stock), for example according to the FIG. 1, is provided. The laminate may be already die-cut (not shown in FIG. 12) or it may be die-cut after printing. Web of laminate 802 is unwound form the roll 801 and proceeded to a printer unit 803. In this example the topmost layer of the laminate web is a printable layer. Before printing, the print layer may be surface treated. For example the print layer may be corona treated before actual printing. Corona treatment equipment, or other suitable surface treatment equipment may be situated before the printer unit 803. The printer unit 803 may be for example a matrix, laser or thermal transfer printing unit. Printing methods may comprise flexographic, gravure, screen printing, offset, letterpress, or any other suitable printing methods compatible with the currently used laminate 802. Print is applied on the printable surface of a laminate web 802 at the printer unit 803. Printing is accomplished using a printer unit 803, such as a printing press. Examples of the printed laminate web 804 is illustrated in more detail in the FIGS. 2, 3 and 7.

After the laminate web has been printed, the second integral unit including the second adhesive layer 805 is delaminated from the first integral unit including a face stock 806. The first integral unit including the face stock runs along the original machine direction as a separate integral unit. The delaminating may be carried out in a delaminating unit.

The delaminated second integral unit 805 is guided away from the face stock web 806, for example upwards or downwards from the face stock web 806. In one embodiment the second integral unit 805 is arranged, for example by using suitable side rolls, to be guided to the other side of the first integral unit including a face stock 806 and laminated in such way that a label structure 110 as shown in FIG. 4*b* or 5*b* is obtained. If the printed laminate web was already die-cut, the individual shapes of the first and the second integral units are arranged to match accurately (not shown in FIG. 12). In this embodiment none of the integral units are inversed, i.e. turned around. This stage may be carried out in a laminating unit.

Figure 13:
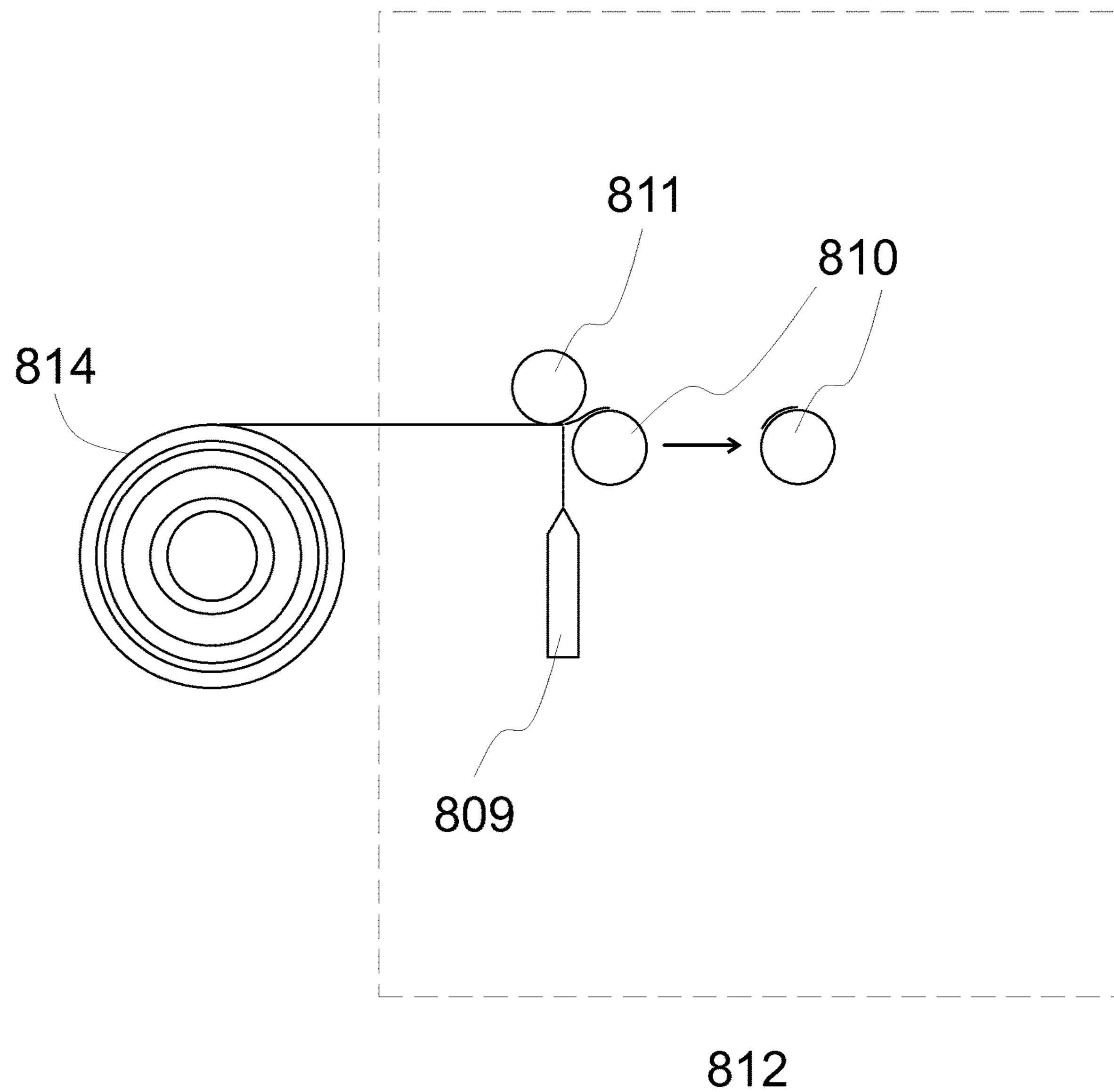
FIG. 13 illustrates an apparatus for manufacturing the label.

In one embodiment the relaminated label laminate is then die-cut using the means for die-cutting 813 located after the relaminating means and before the contactless cutting means. The predefined shapes are arranged to be cut in such way that the print matches the shape of the final label i.e. the print is usually in the middle of the label. A continuous printed linerless face laminate web is obtained having individual shapes attached to each other via the bridge. The cut waste material is removed (not shown in FIG. 12). The face laminate web may be wound into a roll 814 for storage and/or transport and provided to a dispensing unit, which may be in another location, for labelling items. FIG. 13 shows the dispensing unit.

The obtained printed face laminate web 808 is guided to a dispensing and/or labelling unit 812 comprising also means for carrying out the contactless cutting 809. Said means for carrying out the contactless cutting 809 may comprise for example a laser device for laser cutting, water inkjet device for water cutting or a laser microjet cutter device. The means for carrying out contactless cutting 809 may be connected to a control unit, sensors and other devices or means required to recognize the predetermined cutting site from the label web, to control and move the cutting device, such as a laser, to cut accurately at the desired cutting site, which is the bridge between the individual shapes.

An individual label is cut apart from the face laminate web and applied onto a surface of an item to be labelled 810. After said item 810 has been labelled, the item 810 is guided and moved away from the labelling unit and a new unlabelled item is provided to be labelled. The labelling unit may comprise means for applying pressure to the label against the item to activate the pressure sensitive adhesive 102 and to adhere the label 110 to the item, for example to a bottle. Said means for applying pressure may comprise for example one or more rollers 811 which may also be arranged to turn the item during the labelling and move the item forward in the labelling line.

The apparatus described above with reference to FIG. 13 may be a dispensing machine, or part of a dispensing machine, or a dispensing machine may be a part of said apparatus. A dispensing machine generally refers to an automatic label dispensing machine or label applicator which is arranged to advance a label or laminate stock until a portion of the label is extended into the path of the oncoming item. The speed of the label web is arranged to match the speed of the items. When the label is applied, it may be tamped or wiped to assure adhesion to the item. Proper alignment of the label on the item depends on sensors that sense the location/orientation of the item and label sensors that detect the location of the label edge. Package sensors can be a variety of position sensors, optical sensors or ultrasonic sensors. Label sensors are usually inexpensive photoelectric sensors. Because clear labels cannot be detected by photoelectric sensors, generally capacitive and ultrasonic technologies are used for clear label detection.

EXAMPLES

In one example a non-annealed MDO-PETG (1% secant modulus approximately 6000 MPa) face-stock is combined with a PS-adhesive and siliconised annealed BOPET liner (1% secant modulus 4300 MPa). The siliconised liner is delaminated and relaminated to the face-stock with the use of a polyurethane adhesive (coatweight approximately 4 gsm). The density of the label is greater than 1.0. This label is suitable for example for labelling glass bottles.

In one example a non-annealed TDO-PETG (1% secant modulus approximately 5047 MPa) face-stock is combined with a PSA and a siliconised annealed BOPET liner (modulus 4300 MPa). The siliconised liner is delaminated and relaminated to the facestock with the use of a polyurethane adhesive. The density of the label is greater than 1.0. This label is suitable for example for labelling glass bottles.

In one example a non-annealed MDO-polyolefin film (modulus 800-2000 MPa) comprising COC, is combined with a PSA and a siliconised annealed BOPET liner (modulus 4500-5000 MPa). The siliconised liner is delaminated and relaminated to the face-stock with the use of a UV-curable acrylic adhesive. The density of the label is greater than 1.0. This label is suitable for example for labelling glass bottles.

In one example a non-annealed MDO polyolefin film (modulus 800-2000 MPa), comprising COC, is combined with a PSA and a siliconised annealed BOPP liner (modulus 1800-2500 MPa). The siliconised liner is delaminated and relaminated to the facestock with the use of a polyurethane adhesive. The density of the label is less than 1.0. This label is suitable for example for labelling glass bottles.

In one example a non-annealed TDO film, comprising both PS and PO layers (modulus 1000-2000 MPa), is combined with a PSA and a siliconised annealed BOPP liner (modulus 1800-2500 MPa). The siliconised liner is delaminated and relaminated to the facestock with the use of a PUR adhesive. The density of the label is less than 1.0. This label is suitable for example for labelling glass bottles.

In one example a non-annealed TDO PLA film (modulus approximately 4000 MPa) is combined with a PSA and siliconised non-annealed MDO-PET liner (modulus approximately 7000 MPa). The siliconised liner is delaminated and relaminated to the facestock with a PUR adhesive. The density of the label is greater than 1.0. This label is suitable for example for labelling glass bottles.

In one example a non-annealed MDO polyolefin film (modulus 800-2000 MPa) is combined with a PSA and a annealed BOPP liner (modulus 800-2000 MPa). The liner is delaminated and relaminated to the facestock with a PUR adhesive (coatweight of 2-5 gsm). The density of the label is less than 1.0. This label is suitable for example for labelling PET bottles.

In one example a non-annealed TDO polyolefin film (modulus 1000-2000 MPa), comprising COO, is combined with a PSA and a non-annealed MDO-PP-liner (modulus 2700-4000 MPa). The siliconised liner is delaminated and relaminated to the facestock with a PUR adhesive. The density of the label is less than 1.0. This label is suitable for example for labelling PET bottles.

In one example a non-annealed multilayer MDO film, comprising both PS and PO layers (modulus 1000-2000 MPa), is combined with a PSA and a annealed BOPP liner (modulus 1800-2500 MPa). The siliconised liner is delaminated and relaminated to the facestock. The density of the label is less than 1.0. This label is suitable for example for labelling PET bottles.

In one example a facestock comprising clear BOPP (modulus 1800-2500 MPa) is combined with a PSA adhesive and a siliconised annealed BOPET liner (modulus approximately 4500 MPa). The siliconised liner is delaminated and relaminated with the use of PUR adhesive to the facestock. The density of the label is greater than 1.0. This label is suitable for example for labelling glass bottles, for example as a permanent label for a beer bottle.

In one example a facestock comprising clear BOPP (modulus 1800-2500 MPa) is combined with a PSA adhesive and a siliconised annealed MDO-PP liner (modulus 2500-3700 MPa). The siliconised liner is delaminated and relaminated to the facestock with a PUR adhesive. The density of the label is less than 1.0. This label is suitable for example for labelling glass bottles, but also for PET bottles.

Adhesion of labels comprising polypropylene films as the first and the second layers laminated with acrylic UV hotmelt adhesive were measured at different temperatures in an alkalic water bath using a spring scale. The tests were carried out at 50° C., 65° C. and 75° C.

TABLE 1

| | 50° C. | 65° C. | 75° C. |
|---|---|---|---|
| Test 1 | 19 | 10 | 3 |
| Test 2 | 22 | 12 | 2 |
| Test 3 | 20 | 10 | 3 |
| Average/g | 20.3 | 10.7 | 2.7 |
| Average/ N/2.5 cm | 0.20 | 0.10 | 0.03 |

Washable Label Having Two Films Oriented in Different Directions

Table 2 shows examples of suitable polymers that can be used in the washable label having two films oriented in different directions. The stretch ratios may be applied in both MD or CD directions. The maximum shrinkages were measured at 80° C.

TABLE 2

| Polymer | x times orientation, either MD or CD | max shrinkage % |
|---|---|---|
| PVC | 3-5 | 70 |
| PETG | 3-5 | 80 |
| OPS | 3-5 | 75 |
| PS/PO blend | 5-10 | 75 |
| PO (incl. also C-O-C) | 2-5 | 75 |
| PP | 5-10 | 50 |
| PLA | 2-10 | 75 |
| PS/PET | 2-5 | 75 |

The thicknesses may be 10-90 μm total thickness, more likely 20-60 μm. The thickness of the individual layers, that does not have to be identical in thickness, may be in the range of 10-30 μm.

Polymers which were found preferable to be used in the face laminates include PETG, oriented polystyrene, polystyrene/polyolefin blend, polyolefin containing COC, and polypropylene. The maximum shrinkages were found to be even 80% and generally being in the range of 50-80%.

Labels Having Pressure Sensitive Adhesive Sensitive to the Washing Conditions

Adhesion of labels comprising polypropylene films as the first and the second layers laminated with acrylic UV hotmelt adhesive were measured at different temperatures in an alkalic water bath using a spring scale. The tests were carried out at 50° C., 65° C. and 75° C. and the results are presented in Table 3. It can be seen that the peel values are about 0.2 N/25 mm at 50° C. and less at higher temperatures.

TABLE 3

| A peel test | | | |
|---|---|---|---|
| | 50° C. | 65° C. | 75° C. |
| Test 1 | 19 | 10 | 3 |
| Test 2 | 22 | 12 | 2 |
| Test 3 | 20 | 10 | 3 |
| Average/g | 20.3 | 10.7 | 2.7 |
| Average/ N/2.5 cm | 0.20 | 0.10 | 0.03 |

The invention claimed is:

1. A wash-off removable printed linerless face laminate in the form of a continuous label web having a plurality of individual labels wound into a roll for dispensing with an automatic label dispensing machine configured to separate the individual labels from the label web and feed the labels onto a surface of a product to be labelled, the wash-off removable printed linerless face laminate comprising the following layers in the following order:

a release layer comprising a release agent, a second layer comprising a thermoplastic polymer, a second adhesive layer, a first layer comprising a thermoplastic polymer or fiber-based material, and a first adhesive layer comprising a pressure sensitive adhesive capable of forming a bond when pressure is applied at room temperature, wherein the pressure sensitive adhesive is an acrylic-based adhesive selected from emulsion and water-based pressure sensitive adhesives exhibit a reduction in adhesive force at 65° C. and wherein the individual labels are removable from the plastic bottle at washing conditions comprising a temperature of 65-75° C. and exposure to an aqueous alkaline solution;

wherein the print is on one or more printable surface(s) between the first layer and the second layer; and wherein the first layer and/or the second layer comprises a biaxially oriented film and the other of the first layer or the second layer comprises a non-annealed monoaxially oriented film, wherein the second adhesive layer comprises an adhesive selected from the group consisting of a polyurethane adhesive and a UV curable acrylic adhesive, wherein adhesion of the second adhesive does not substantially decrease at the washing conditions so that the first layer and the second layer attached with the second adhesive will not be separated during washing, and wherein the plurality of individual labels are formed by die-cutting through each layer to provide the continuous label web having no matrix material around the individual labels, wherein the individual labels are directly attached to each other by an uncut bridge between the individual labels.

2. The printed face laminate of claim 1, wherein the first layer comprises a polymer selected from the group consisting of polyethylene, polypropylene, polyethylene terephthalate, polylactic acid, polystyrene, polyvinyl chloride, polyester, cyclic olefin (co)polymer and copolymers and derivatives thereof.

3. The printed face laminate of claim 1, wherein the first layer comprises paper.

4. The printed face laminate of claim 1, wherein the second layer comprises a polymer selected from the group consisting of polyethylene, polypropylene, polyethylene terephthalate, polylactic acid, polystyrene, polyvinyl chloride, polyester, cyclic olefin (co)polymer and copolymers and derivatives thereof.

5. The printed face laminate of claim 1, wherein the release agent comprises silicone.

6. The printed face laminate of claim 1, wherein the total thickness of the face laminate is in the range of 20-100 μm.

7. The printed face laminate of claim 1, having a total average density of less than 1.0 g/cm$^3$.

8. The printed face laminate of claim 1, having a total average density of at least 1.0 g/cm$^3$.

9. The printed face of claim 1, wherein the first layer comprises a machine direction oriented film.

10. The printed face laminate of claim 1, wherein the second layer comprises a machine direction oriented film.

11. The printed face laminate of claim 1, wherein the first layer comprises a machine direction oriented (MDO) film and the second layer comprises a biaxially oriented film.

12. The printed face laminate of claim 1, wherein the face laminate has a stiffness of at least 3 mN/m, as measured using Lorentzen & Wettre (L&W) method.

13. The wash-off removable printed face laminate of claim 1, wherein the individual labels are selected from round, angular, elliptical, square, or shapes having a combination of angular and arched shapes.

14. The wash-off removable printed face laminate of claim 1, wherein the uncut bridge between individual labels has a width that is smaller than a largest width of an individual label along the length of the continuous label web.

15. The wash-off removable printed face laminate of claim 1, wherein the uncut bridge is weakened by perforating, thinning, kiss cutting or partial cutting.

16. The wash-off removable printed face laminate of claim 1, wherein the first layer and/or the second layer comprises the non-annealed monoaxially oriented film and has an areal shrinkage in the direction of the orientation of at least 5% at 80° C. defined by ASTM D2732.

17. The wash-off removable printed face laminate of claim 1, wherein the pressure sensitive adhesive has a peel value of less than 0.2 N/25 mm at 65° C.

18. The wash-off removable printed face laminate of claim 1, wherein the pressure sensitive adhesive layer exhibits a peel adhesion of 2-12 times less at 65° C. than at room temperature.

19. The wash-off removable printed face laminate of claim 1, wherein the pressure sensitive adhesive has a solubility of less than 25% in an aqueous alkaline solution at temperature of 65° C.

20. The wash-off removable printed face laminate of claim 1, wherein an individual label separated from the wash-off removable printed face laminate is attached to the surface of a plastic bottle exhibiting heat shrinkage during washing.

21. The wash-off removable printed face laminate of claim 1, wherein an individual label separated from the wash-off removable printed face laminate is attached to a polyethylene terephthalate bottle exhibiting heat shrinkage during washing.

22. The wash-off removable printed face laminate of claim 1, wherein the second adhesive layer consists of a UV curable acrylic adhesive.

23. A method for producing a wash-off removable printed face laminate, the method comprising providing a printable laminate having one or more printable surface(s) and multiple layers in the following order:

a first layer comprising a thermoplastic polymer or fiber-based material, a first adhesive layer comprising a pressure sensitive adhesive capable of forming a bond when pressure is applied at room temperature, wherein the pressure sensitive adhesive is an acrylic-based adhesive selected from emulsion and water-based pressure sensitive adhesives exhibit a reduction in adhesive force at 65° C.;

a release layer comprising a release agent, and a second layer comprising a thermoplastic polymer;

printing on the one or more printable surface(s);

separating the first layer and the first adhesive layer, from the release layer and the second layer;

rearranging the release layer and the second layer on top of the first layer and the first adhesive layer, with the release layer on top of the construction;

laminating the first layer and the second layer together with a second adhesive layer, to form the printed face laminate of claim 1; and winding the printed face laminate into a roll, wherein the second adhesive layer comprises an adhesive selected from the group consisting of a polyurethane adhesive and a UV curable acrylic adhesive, wherein adhesion of the second adhesive does not substantially decrease at the washing conditions so that the first layer and the second layer attached with the second adhesive will not be separated during washing.

24. The method of claim 23, wherein the printable laminate having a printable surface has the following layers in the following order:

the first layer comprising a thermoplastic polymer or fiber-based material, the first adhesive layer comprising a pressure sensitive adhesive capable of forming a bond when pressure is applied at room temperature, the release layer comprising a release agent, the second layer comprising a thermoplastic polymer, and the second adhesive layer.

25. The method of claim 23, further comprising die-cutting the printed face laminate through all the layers to form a plurality of predefined shapes for the printed face laminate, and defining a bridge between individual shapes to form a laminate web having plurality of individual shapes attached to each other.

26. The method of claim 25, wherein the bridge is not weakened.

27. The method of claim 25, further comprising weakening the bridge.

28. A wash-off removable printed linerless face laminate web obtained with the method of claim 23.

29. A method for preparing a face laminate, comprising providing the wash-off removable printed face laminate web of claim 28 having plurality of individual shapes attached to each other, or the wash-off removable printed face laminate of claim 1 having a plurality of individual shapes attached to each other by a bridge between the individual shapes, separating the individual printed face laminates from the printed face laminate web by cutting or tearing said bridge to obtain separate printed face laminates.

* * * * *